United States Patent
Mehnert et al.

(10) Patent No.: US 9,587,962 B2
(45) Date of Patent: Mar. 7, 2017

(54) METHOD OF AND APPARATUS FOR ASCERTAINING THE FINE POSITION VALUE OF A MOVABLE BODY

(75) Inventors: Walter Mehnert, Ottobrunn (DE); Thomas Theil, Feldafing (DE)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 1141 days.

(21) Appl. No.: 13/501,167

(22) PCT Filed: Feb. 23, 2011

(86) PCT No.: PCT/EP2011/000879
§ 371 (c)(1),
(2), (4) Date: Jun. 29, 2012

(87) PCT Pub. No.: WO2011/107233
PCT Pub. Date: Sep. 9, 2011

(65) Prior Publication Data
US 2012/0259573 A1 Oct. 11, 2012

(30) Foreign Application Priority Data
Mar. 5, 2010 (DE) .................. 10 2010 010 560

(51) Int. Cl.
*G01D 5/14* (2006.01)
*G01D 5/244* (2006.01)

(52) U.S. Cl.
CPC ......... *G01D 5/145* (2013.01); *G01D 5/24452* (2013.01)

(58) Field of Classification Search
CPC ... G01D 5/2053; G01D 5/24452; G01D 5/145
See application file for complete search history.

(56) References Cited

U.S. PATENT DOCUMENTS 5,535,142 A  7/1996  Mehnert et al.
6,242,906 B1  6/2001  Andermo
(Continued)

FOREIGN PATENT DOCUMENTS

DE  4224225 A1  1/1994
EP  1 052 481 A2  11/2000
(Continued)

OTHER PUBLICATIONS

Communication dated Oct. 31, 2014, issued by the State Intellectual Property Office of the People's Republic of China in counterpart Application No. 201180004175.4.
(Continued)

*Primary Examiner* — Mischita Henson
(74) *Attorney, Agent, or Firm* — Sheridan Ross P.C.

(57) ABSTRACT

A position sensor for ascertaining the fine position value z of a movable body includes an exciter unit moving therewith and a stationary sensor unit (7) which simultaneously delivers a plurality of output signals jointly describing the fine position value. In a calibration mode there is established a defined relationship between the exciter unit and a calibration unit (31) such that groups of amplitude values can be taken off from said output signals and groups of average values are formed therefrom, which are fed to the calibration unit (31) which converts them into reference values using the calibration fine position values μ(z) and stores same with the associated fine position as an associated values multiplet in a comparative value memory (14). In each measuring mode groups of amplitude are taken off from the output signals from which groups of measuring values are produced by averaging and are fed to a computing unit (10), which forms differences of cross products from the reference values of varying groups of reference values and the current
(Continued)

Figure 1:
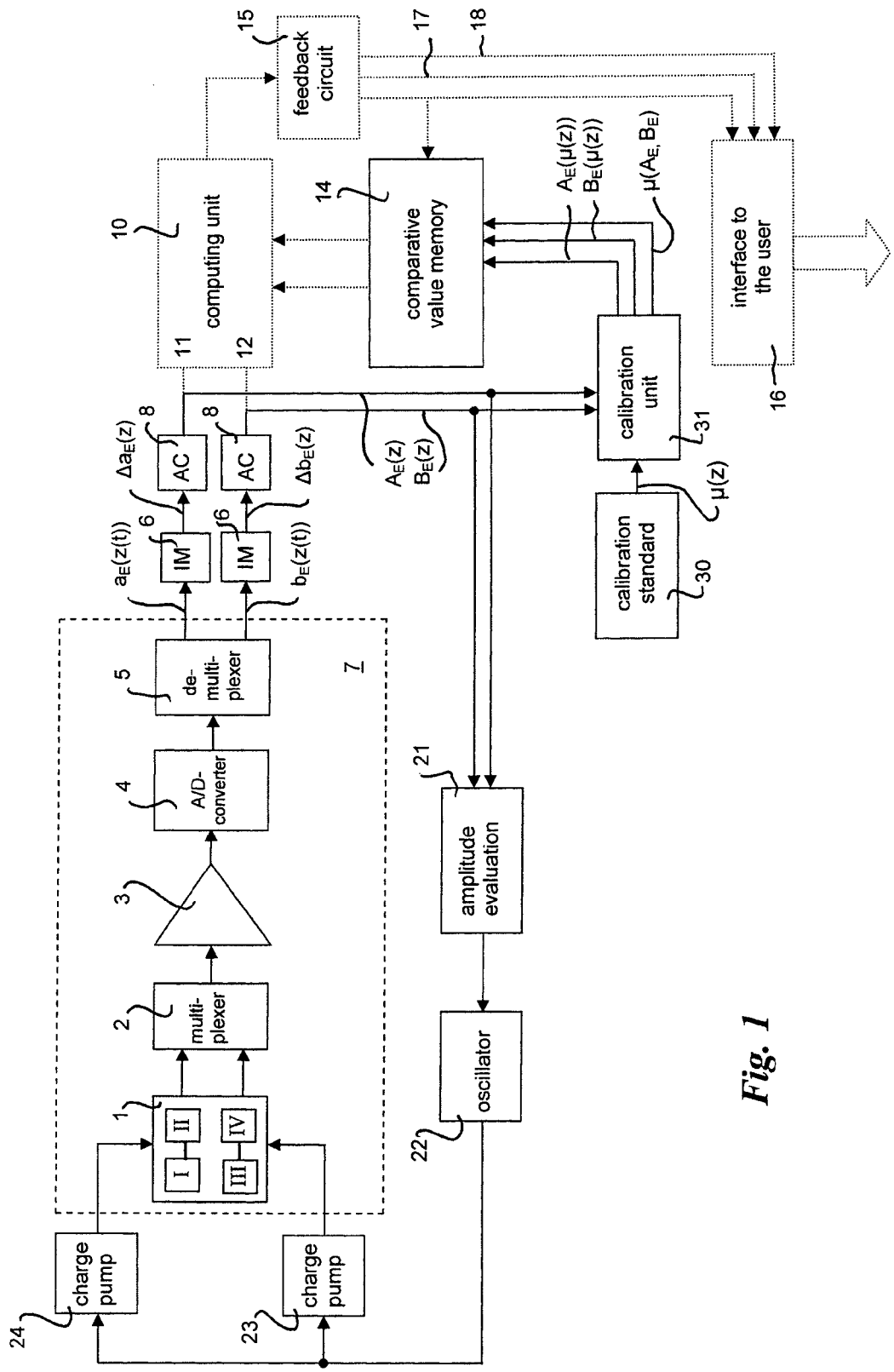

measuring value group and causes said differences to go towards zero to ascertain the current fine position value.

9 Claims, 11 Drawing Sheets

(56) References Cited

U.S. PATENT DOCUMENTS

2002/0004124 A1  1/2002  Hirasawa et al.
2004/0093140 A1  5/2004  Inagaki

FOREIGN PATENT DOCUMENTS

EP  1195579 B1  9/2001
EP  1 415 895 A2  5/2004

OTHER PUBLICATIONS

Communication dated Oct. 14, 2014, issued by the Japanese Patent Office in counterpart Application No. 2012555324.
Communication dated Aug. 12, 2010, issued by the German Patent Office in counterpart Application No. 101020010560.0.
Communication dated Nov. 10, 2014, issued by the European Patent Office in counterpart Application No. 11707792.5.
International Search Report of PCT/EP2011/000879 dated Nov. 30, 2011.
International Preliminary Report on Patentability; PCT/EP2011/000879; Oct. 4, 2012.
German Search Report Application No. 10 1020 010 560.0-52; Aug. 12, 2010.

METHOD OF AND APPARATUS FOR ASCERTAINING THE FINE POSITION VALUE OF A MOVABLE BODY

CROSS REFERENCE TO RELATED APPLICATIONS

This application is a National Stage of International Application No. PCT/EP2011/000879 filed Feb. 23, 2011, claiming priority based on German Patent Application No. 10 2010 010 560.0 filed Mar. 5, 2010, the contents of all of which are incorporated herein by reference in their entirety.

The invention concerns a method of ascertaining a fine position value z describing the instantaneous absolute position of a movable body by means of a position sensor as set forth in the classifying portion of claim 1 and an apparatus suitable for carrying out such a method.

An absolute position sensor described in German patent application DE 10 2009 010 242.6 which is not a prior publication includes a so-called segment counter which, as an exciter unit, has a magnet carrier which is fixedly connected to the movable body and on which are mounted a plurality of permanent magnets which are arranged at spacings from each other in the direction of movement and whose alternately successive North and South poles form so-called measuring segments which cover the range of movement of the movable body to be monitored and by the counting of which a coarse position value is determined for same.

A stationary sensor unit serves for that counting operation and for fine resolution of the measuring segments, the sensor unit including at least two sensors formed for example by Hall elements for ascertaining the respective instantaneous fine position value z.

Admittedly, reference is predominantly made in the present description to a position sensor in respect of which an exciter unit equipped with at least one permanent magnet and magnetic field sensors are used, but that only represents a preferred option. The method according to the invention can also be used in the same fashion if the interaction between the exciter unit and the sensors is procured by another physical parameter. That is intended to be made clear by the fact that, instead of the term "magnet segment", the present description uses the expression measuring segment. At any event each of the at least two sensors delivers an electric sensor signal.

Position sensors are already frequently referred to as "absolute" when they are capable of still correctly counting off the measuring segments by means of a backup battery in the event of failure of the main power supply, so that when the power supply is restored the correct segment counting value is then available immediately even if the body to be monitored has moved on in the meantime. The position counter described in above-mentioned German patent application DE 10 2009 010 242.6 is in comparison "absolute" in the strict sense, that is to say it does not require such a back-up battery for continued correct counting of the measuring segments because the electric energy required for that purpose is taken from the kinetic energy of the body to be monitored by means of the exciter unit and a Wiegand wire arrangement. The present invention can be used in the same manner in relation to all those kinds of position sensors.

A definite overall position value is ascertained by means of an electronic processing unit from the coarse position value ascertained by counting of the measuring segments and the fine position value z obtained by resolution of the measuring segments, the accuracy of the overall position value corresponding to that of the fine position value z.

Depending on the respective number of the permanent magnets in the exciter unit, a position sensor in which the method according to the invention is used can have either a single measuring segment or a plurality of measuring segments involving fine resolution. In the former case the measuring segment extends over the entire measuring distance, that is to say in the case of a linear movement for example over the entire extent of movement of the body to be monitored or in the case of a rotary movement over a rotary angle range of less than 180°, as is the case for example if it is the range of pivotal movement of the accelerator or brake pedal of a motor vehicle that is to be detected. At least two measuring segments are required to cover a larger rotary angle range, in particular a complete circle of 360°.

As an alternative thereto the measuring distance is covered by a plurality of measuring segments. As the lengths of the measuring segments in the direction of movement are generally not exactly equal the sensors supply quasi-periodic sensor signals, wherein half a period length respectively corresponds to a measuring segment length. However even when the measuring segment lengths were precisely equal, that would not involve sensor signals which are periodic in the strict sense because the amplitude values thereof normally have curve shapes differing from one measuring segment to another.

Because of the approximate periodicity of the sensor signals the fine position values z can be treated like angular values irrespective of whether the movement to be monitored involves a linear displacement or a rotary movement. It is to be noted in that respect that, in the case of a rotary sensor, those angular values correspond to the angular values of a full revolution of the body to be monitored, for example a shaft, only when the full circular angle of 360° is covered only by two measuring segments.

In all other situations such as for example in respect of the above-mentioned position sensor in accordance with German patent application DE 10 2009 010 242.6 the full angle of the shaft rotation is subdivided into a plurality of, for example $\lambda$, measuring segments. A period embracing 360° of each of the sensor signals corresponds to the angular extent of two measuring segments and thus only the $\lambda/2$-nd part of a full revolution of the shaft. The indeterminate nature of the actual position, which occurs as a result, is caught up by counting of the measuring segments. As the segment counting device can count more than $\lambda$ measuring segments such a position sensor forms a multiturn device which can track a large number of full revolutions in exactly measuring relationship and resolve same.

If the body to be monitored is moving both the coarse and also the fine position value change in dependence on time so that the exact notation for the fine position value is z(t). If the body is stationary then z—disregarding fluctuations caused by noise—is of a fixed value which corresponds to the instantaneous position and which does not change until a movement occurs again. The values which z respectively assumes when the body comes to a stop can be completely different from each other because a stop can occur in the most widely differing positions, each of which is uniquely characterized by their associated coarse and fine position values.

To ascertain the fine position values z(t) however it is generally not the at least two output signals a(z(t)) and b(z(t)) of the sensor unit itself that are used, but at least two derived signals, each of which is obtained from a respective one of the output signals a(z(t)) and b(z(t)), in particular by amplification and/or digitization and/or averaging, so that the information contained in the instantaneous amplitude values of the output signals a(z(t)) and b(z(t)) at each moment in time t is retained, which information permits a unambiguous identification of the associated fine position values z(t) within the measuring segment in question.

For that purpose, in the state of the art, the at least two derived signals are compared by means of a computing unit to reference values which are derived from ideally sinusoidal or cosinusoidal curves and are stored in a read only memory.

That however would lead to error-free results only when the sensor signals or the signals derived therefrom were of an ideally sinusoidal or cosinusoidal curve shape. In practice such a condition cannot actually be achieved. The specified signals can admittedly be reproduced for each of the individual measuring segments but they involve deviations from the exactly sinusoidal configuration, which in addition are different from one measuring segment to another.

To overcome that problem, DE 10 2009 010 242.6 proposes performing a calibration operation prior to first use of such a position sensor, by means of which calibration operation the deviations of the derived signals from the ideal configuration are detected in order to ascertain correction values which are then used in the actual measuring procedures or position determining procedures. However there is no more precise information about that.

Separate storage of correction values in a separate comparative value memory is laborious and complicates mathematical evaluation of the derived signals and therefore slows down the overall procedure for ascertaining the respective fine position value z(t).

In comparison the object of the invention is to simplify the method as set forth in the opening part of this specification to the essential and thereby to reduce the apparatus complication and expenditure to its limit in order to permit, in particular using as few and inexpensive components as possible, a highly accurate fine positioning determination having a high-resolution and being highly dynamic in respect of which neither the geometry of the exciter field nor the geometry of the sensor arrangement nor multiplicative and/or additive disturbance variables have an influence on the measuring result.

To attain that object the invention provides the features recited in claim 1.

The following is to be stated in relation to the nomenclature used in the claims and the description hereinafter:

It has already been mentioned that, in respect of the methods considered here, it is necessary to use at least two sensor output signals of differing curve shapes or configurations to be able to identify the instantaneous fine position value. In situations of use in which particularly high demands in terms of accuracy are not made, that is sufficient, but not if highly accurate measuring results have to be achieved.

The method according to the invention therefore provides that basically both during the calibration mode and also during the measuring mode more than two, for example four or even 12 or 16 sensor signals can be detected and evaluated, as is described in greater detail hereinafter.

To indicate this the output signals of the sensor unit are denoted by $a_E(z(t))$, $b_E(z(t))$, ... and $a_M(z(t))$, $b_M(z(t))$, ..., respectively, wherein the indices E and M describe signals (and amplitude values obtained therefrom in the course of further operation or average values formed from the amplitude values) which are obtained and processed during the calibration mode (E) and during the measuring mode (M), respectively. Wherever information about those signals is given independently of the mode of operation the index E and M respectively is omitted. All signals are physical parameters consisting of a sign, a measured value and a unit of measurement.

The only essential point is that there is a correlation being straight forward in both directions between the amplitude values $\Delta a(z(t_\nu))$, $\Delta b(z(t_\nu))$, ... obtained at the same time at any measuring moment $t_\nu$ from the plurality of output signals a(z(t)), b(z(t)), ..., and the fine position value $z(t_\nu)$ assumed by the body at that measuring moment $t_\nu$.

In simple cases the plurality of output signals a(z(t)), b(z(t)), ... are of an approximately periodic configuration over two successive measuring segments, in the sense that they have two zero crossings and a maximum value and a minimum value, they are of a steady configuration and in that they have phase shifts which are dependent on the mutual position of the sensors. Then, a single amplitude value group $\Delta a(z)$, $\Delta b(z)$, ... is associated in a reversibly unambiguous fashion with each fine position value z in those two measuring segments. Generally however the situation in the method according to the invention is as follows: for correctly ascertaining the fine position values z the amplitude values $\Delta a(z)$, $\Delta b(z)$, ... and neither the form of the respective curve configuration of each of the output signals a(z(t)), b(z(t)), ... forming the basis thereof nor the functions describing those curve configurations are decisive; the latter only have to be continuous.

If the plurality of output signals a(z(t)), b(z(t)), ... are of a less simple configuration than that just described, so that for example it has a plurality of maxima and/or minima and/or a plurality of intersection points within a measuring segment, it is only necessary to ensure that the respective fine position value $z(t_\nu)$ is always uniquely described.

The symbol $\Delta$ was adopted for the amplitude values that were obtained, to make it clear that this can respectively involve a "whole amplitude value" related to a zero value which is selected as desired, or an alteration value reproducing the change in the amplitude in question in relation to the preceding fine position measurement.

The measuring moments $t_\nu$ can be determined by a scanning clock frequency. As an alternative thereto however it is also possible to implement scanning in dependence on an event which does not regularly occur, for example triggered by a change in position of the body or by a data request from the user of the measuring values produced by the position sensor, and so forth.

The term "instantaneous fine position value" denotes the fine position value which belongs to the position adopted by the body at the moment $t_\nu$ considered. Apart from fluctuations caused by noise, it is not further variable as such in respect of time so that for the sake of simplicity the argument $t_\nu$ can be dispensed with and the instantaneous fine position value can only still be denoted by z. The same applies for the amplitude values $\Delta a(z)$, $\Delta b(z)$, ... obtained at the measuring moment $t_\nu$. It will be appreciated that, at different measuring moments, at least when the body is moving, there are different values of z and respectively different measuring figures for the associated amplitude values $\Delta a(z)$, $\Delta b(z)$, ..., which can possibly also have different signs.

A substantial difference in respect of the method according to the invention over the state of the art is that it does not require any especial assumptions such as for example "approximately sinusoidal and cosinusoidal" in respect of the curve shapes of the output signals a(z(t)), b(z(t)), ... of the sensor unit. Therefore no reference at all is made to such configurations and in particular no reference values describing sine or cosine curves are used.

It is totally sufficient according to the invention if the amplitude values $\Delta a(z)$, $\Delta b(z)$, ... which are respectively taken off at the same time permit a clear association with or correlation with the respective fine position value z.

That condition does not mean that the amplitude values $\Delta a(z)$, $\Delta b(z)$, ... which are taken off exactly and constantly maintain their values associated with the instantaneous fine position value z if the body to be monitored is motionless in the position in question or always exactly attain those values again when the position z being considered is approached again and again at a plurality of times. "Exactly" can in any case only ever mean that the fluctuations in the magnitudes of the values in question, when the body is stationary, or the differences between the magnitudes of the successively obtained values are less than the respectively required level of measuring accuracy. In other words: in the ideal case the noise of the amplitude values $\Delta a(z)$, $\Delta b(z)$, ... should be less than the desired level of measuring accuracy.

That condition however is to be implemented at best, when the demands on the level of measuring accuracy are high, with very high-grade and correspondingly expensive sensors, amplifiers and analog/digital converters. Here however a method and an apparatus of the kind set forth in the opening part of this specification are to be provided, which can be implemented with components that are as inexpensive as possible.

In accordance with the invention therefore in the further processing procedure, it is not individual amplitude values $\Delta a(z)$, $\Delta b(z)$, ... that are used, but average values $A(z)$, $B(z)$, ... which are simultaneously but separately formed for each of the signals $a(z)$, $b(z)$, .... That serves to eliminate statistical fluctuations (noise). An averaging method which is particularly suitable for that purpose and which involves a high level of dynamics is described in DE 10 2009 023 515 which is not a prior publication.

As a plurality of successively occurring amplitude individual values are detected and processed for each average value, each of the above-mentioned "measuring moments" $t_v$ actually involves a differential period of time at the moment $t_v$. By using a high scanning clock frequency those periods of time however can be kept so short that the position of the body to be monitored does not markedly change therein at least when the speed of movement of the body to be monitored is not very high. With high speeds of movement a draging error occurs due to the averaging operation, and that error results in a slight reduction in instantaneous accuracy. That however is acceptable because the draging error can be corrected and the accuracy demands at high speeds are in any case lower.

In order to be able to form highly accurate average values $A_E(z)$, $B_E(z)$, ..., which exactly describe the actual factors of the position sensor in question, in the calibration mode, from the respectively simultaneously obtained amplitude values $\Delta a_E(z)$, $\Delta b_E(z)$, ..., it is preferred if the body to be monitored or the exciter unit coupled thereto of the position sensor moves in the calibration mode at such a low speed that the respective average value is formed before the fine position value z has altered by an increment.

The average values $A_E(z)$, $B_E(z)$, ... formed in that way are associated with the respective exact calibration fine position value $\mu$ which is known to the calibration unit by virtue of the items of information which for example are supplied by a calibration standard. The calibration average values $A_E(\mu)$, $B_E(\mu)$, ... thus represent genuine reference values which reproduce the actual curve shape in the output signals $a_E(z)$, $b_E(z)$, ... of the sensor unit of the position sensor in question and which, for the above-described advantageous case, are stored in the comparative value memory either in the form of value groups or, less advantageously, in the form of groups of quotients $A_E(\mu)/B_E(\mu)$ and so forth together with the associated calibration fine position value $\mu(A_E, B_E, \dots )$.

The part of the method according to the invention, which in the present context is identified by the term "calibration mode" is, strictly speaking, a correlation method, by means of which "markings" obtained from a calibration standard are not transferred onto a "measuring scale" or "marking carrier" of the position sensor to be "calibrated". Rather the groups of genuine reference values which are obtained in the calibration mode in successive moments $t_1$, $t_2$, $t_3$ and so forth from the output signals $a(z(t))$, $b(z(t))$, ... of the sensor unit and each of which is exactly associated with the fine position value $z(t_1)$, $z(t_2)$, $z(t_3)$ assumed at the respective moment $t_1$, $t_2$, $t_3$ and so forth by the exciter unit of the position sensor, which fine position value is in turn correlated with the calibration fine position value $\mu(A_E(t_1), B_E(t_1), \dots )$, $\mu(A_E(t_2), B_E(t_2), \dots )$, $\mu(A_E(t_3), B_E(t_3), \dots )$, and so forth supplied by the calibration standard at the moment $t_1$, $t_2$, $t_3$ in question, are stored together with the latter and while maintaining the link thereto in the calibration value memory. Therefore, for each individual actual position sensor, for a plurality of individual positions of the exciter unit with respect to the sensor arrangement, the genuine reference values covering the range of movement of the body to be monitored with a density which is predetermined by the accuracy demands, are obtained and stored together with the associated calibration fine position value in the comparative value memory. Those reference values are referred to as "genuine" for the reason that they provide an exact image of the configuration of the respective sensor output signals, that is different from one position sensor to another. That is possible even when they are stored in the form of support values. The density of the positions, for which a respective specific support value is ascertained, can be kept low at least in the regions of the respective curve configuration, in which an interpolation leading to adequate accuracy is possible.

In the measuring mode it is sufficient then to obtain or measure the amplitude values $\Delta a_M(z)$, $\Delta b_M(z)$, ... at any measuring time $t_v$ to form therefrom the corresponding average values $A_M(z)$, $B_M(z)$, ... also referred to herein as "measuring values", and to pass same to a computing circuit which progressively compares them group-wise at the end of the processing procedure by means of predetermined mathematical operations to the groups of genuine reference values, that are stored in the comparative value memory. If "coincidence" of the measuring value group (measuring value matrix) associated with the instantaneous fine position value z is established on the basis of suitable criteria with a group, stored in the comparative value memory, of genuine reference values (reference value matrix), then the calibration fine position value $\mu(A_E, B_E, \dots )$ belonging to that reference value group is taken from the comparative value memory and the instantaneous fine position value z is calculated in accordance with the formula $z=m\,\mu$, wherein m is the transmission ratio of the coupling between calibration standard and exciter unit. For a mechanically rigid coupling therefore $m=1$. Coupling for example by a transmission means can lead to any values of m. Alternatively the calibration unit, instead of $\mu$, can also supply the value mea so that the above-described calculation at the end of the processing procedure can be omitted.

Thus the measuring values obtained in the measuring mode serve as identification signals or addresses in the form of a matrix for finding the associated calibration fine position value which is stored in the comparative value memory and which originates from the calibration standard and which therefore also has the accuracy thereof.

A suitable coincidence criterion which can be used can be for example that the difference of cross products, that is formed from the measuring values and the reference values stored in the comparative value memory, is (at least approximately) equal to 0. Unlike the situation in the state of the art however then it is not the value which derives from mathematical processing of (optionally corrected) reference curves stored in the comparative value memory, that is used as the instantaneous fine position value z, but the calibration fine position value $\mu(A_E, B_E, \ldots)$ belonging to the identified reference value group.

The method according to the invention therefore makes it possible to impart to individual position sensors which must have only a high level of reproducibility in respect of the measuring signals supplied by them (which can be achieved with a comparatively low level of technical complication and expenditure), due to the "calibration" performed individually for each thereof, or correlation, with a highly accurate calibration standard, the high level of accuracy thereof. That is substantially less expensive than using a dedicated highly accurate measuring scale for each individual position sensor.

The signal processing required to ascertain the respective instantaneous fine position values $z=m\mu$ from the signals delivered by the sensors can admittedly be performed in a very short period of time, but, with an exciter unit which moves very fast, it leads to a draging error in the sense that the exact fine position value is admittedly outputted, but that occurs at a moment at which the body to be monitored and therewith the exciter unit have also already moved on to a new fine position value. The draging error thus expresses the difference in the true position of the exciter unit relative to the ascertained fine position value $z=m\mu$. The draging error occurring therefore increases with increasing speed of the body to be monitored. It is however known by the increments in the regulating circuit described in greater detail hereinafter and can therefore be corrected.

Preferably the calibration mode is effected prior to the actual measuring mode. In that case the exciter unit of the respective position sensor to be calibrated is preferably mechanically rigidly connected to an external calibration standard (m=1) so that it supplies the calibration fine position values $\mu=z$ belonging to the calibration average values $A_E(\mu), B_E(\mu), \ldots$ obtained in the calibration mode, to a calibration unit belonging to the position sensor. The calibration standard is preferably a highly accurate optical incremental sensor.

As an alternative thereto it is possible, instead of the external calibration standard, to use an internal calibration circuit in respect of which correlation of the exciter unit with the calibration average values $A_E(\mu), B_E(\mu), \ldots$ and correlation of the calibration unit with the calibration fine position values $\mu$ take place in relation to time.

Preferably the range of movement of the body to be monitored is subdivided into a plurality of measuring segments which do not have to be of the same length and which on the one hand are counted absolutely and for which on the other hand fine position values z are ascertained, the arrangement being such that both the output signals a(z(t)), b(z(t)), ... of the sensor unit and also the average values A(z), B(z), ... derived therefrom are semi-periodic, wherein the semi-period length in each case corresponds to the length of the respective measuring segments.

Preferably the sensor signals are supplied by robust magnetic field sensors. Because of divergence of the magnetic field strength equal to zero (div B=0), this situation involves the unambiguous relation of the generating magnetic field to the measuring field.

It is particularly advantageous for the method according to the invention to be used in connection with a rotary sensor.

In a particularly preferred variant of the method according to the invention averaging is effected continuously in such a way that the "old" average value formed from a predetermined number of previously detected individual values is provided with a first weighting factor and the latest individual value is provided with a second weighting factor, and a new average value is formed from those two weighted values, as is described in DE 10 2009 023 515 A1 which is not a prior publication and the technical content of which is incorporated in its full entirety herein by reference.

In order to impart a high level of dynamics to this method, that is to say to give high adaptability to rapid changes in speed in respect of the movement to be monitored, it is particularly preferred for the magnitude of the two weighting factors to vary in dependence on the difference between the old average value and the new individual value, in particular in such a way that the first weighting factor is selected to be correspondingly smaller and the second weighting factor is selected to be correspondingly greater, the greater that difference is, and vice-versa. In that respect preferably the sum of the weighting factors is kept constant.

Preferably formation of the groups of values is triggered by the calibration standard which however does not have to have an extremely high level of resolution, but only a very high degree of accuracy. In that case then the genuine reference values $A_E(\mu), B_E(\mu), \ldots \mu(A_E, B_E, \ldots)$ are stored in the comparative value memory in the form of separate support values, between which liner interpolation is effected for ascertaining intermediate values. In that case the density of the support values can be adapted to the respectively required accuracy in such a way that the error occurring due to linear interpolation is below the permissible error limit. That results in a considerable saving in memory space and a substantial increase in processing speed.

These and further advantageous configurations of the method according to the invention as well as an apparatus suitable for carrying out the method are recited in the appendant claims.

Figure 2:
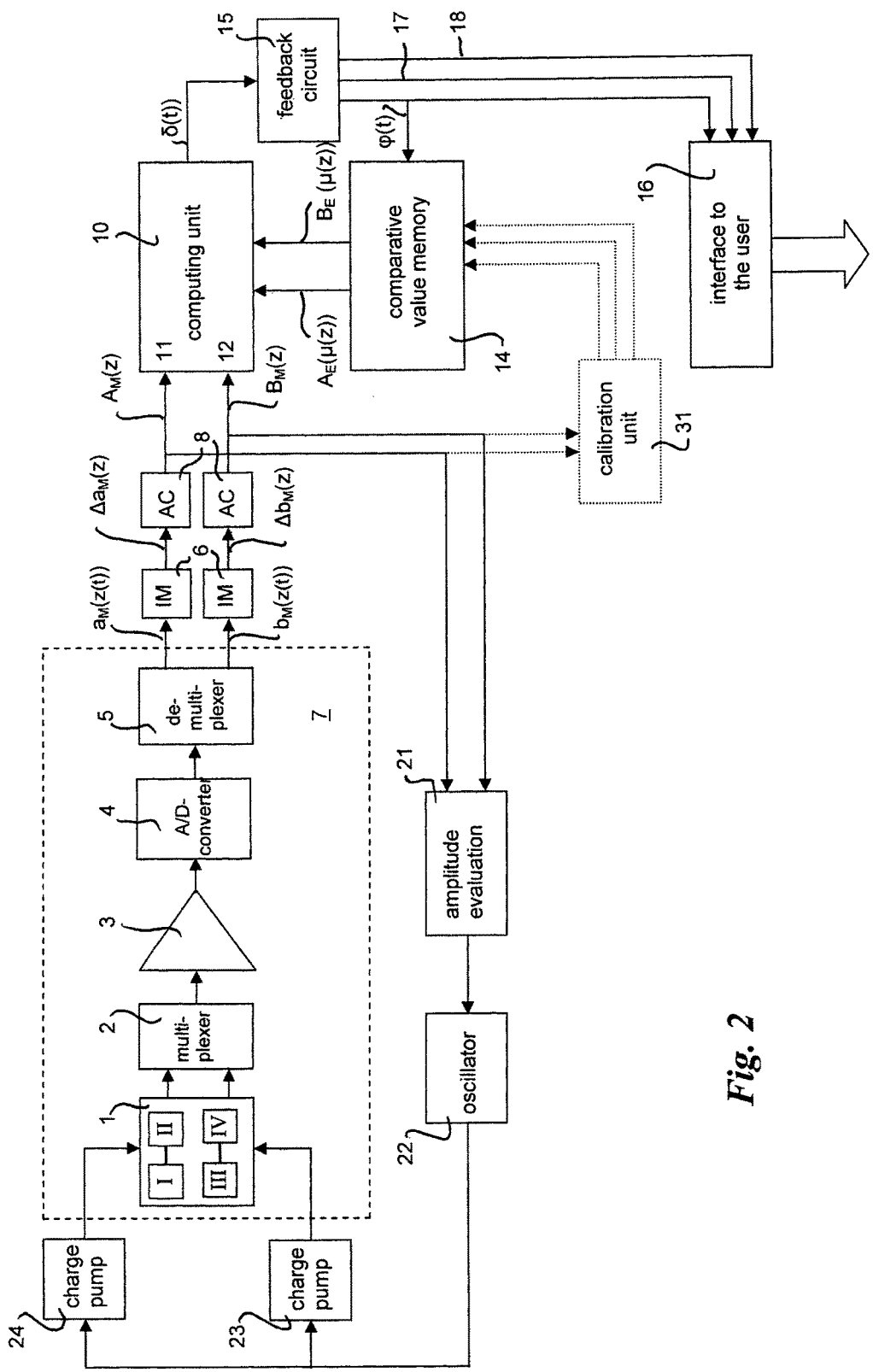
Figure 3:
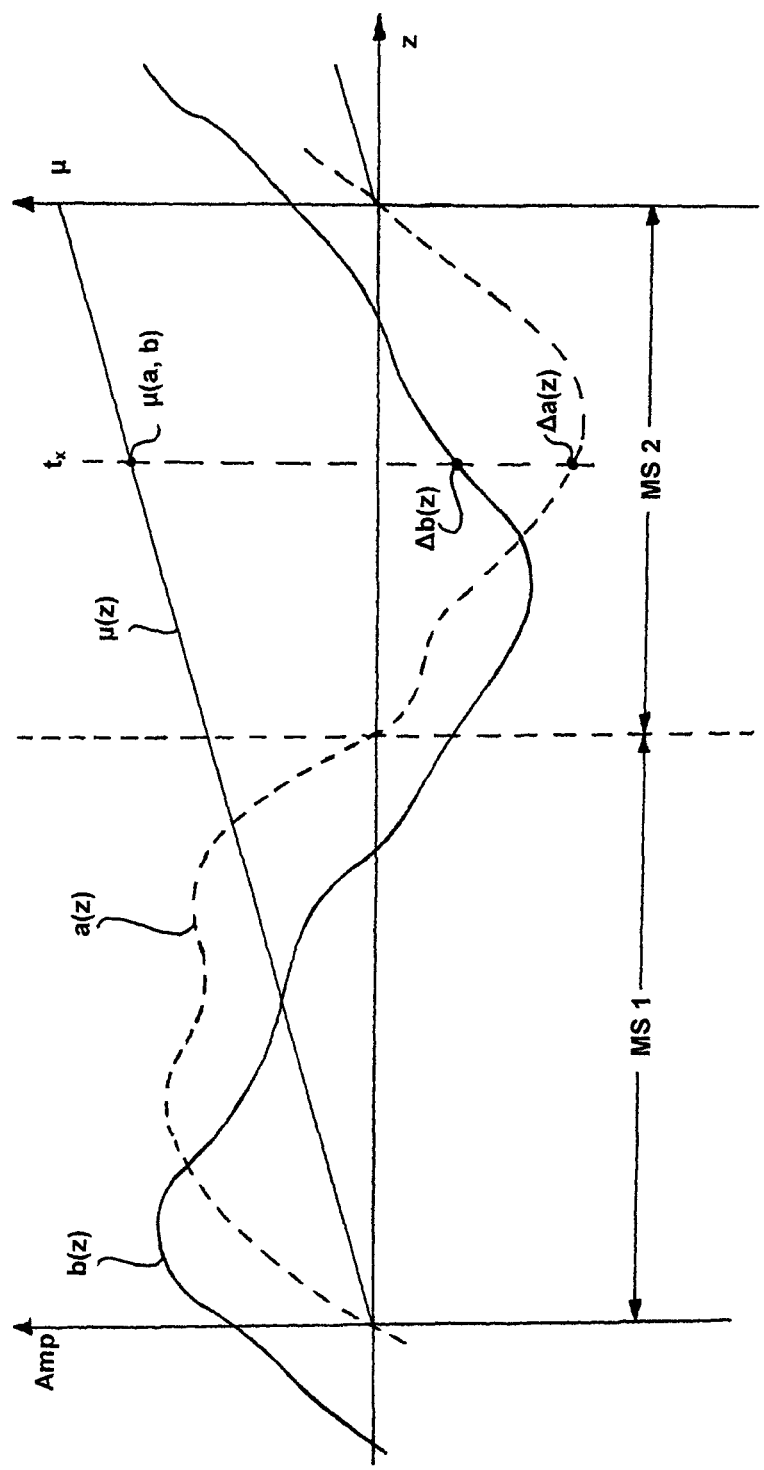
Figure 4:
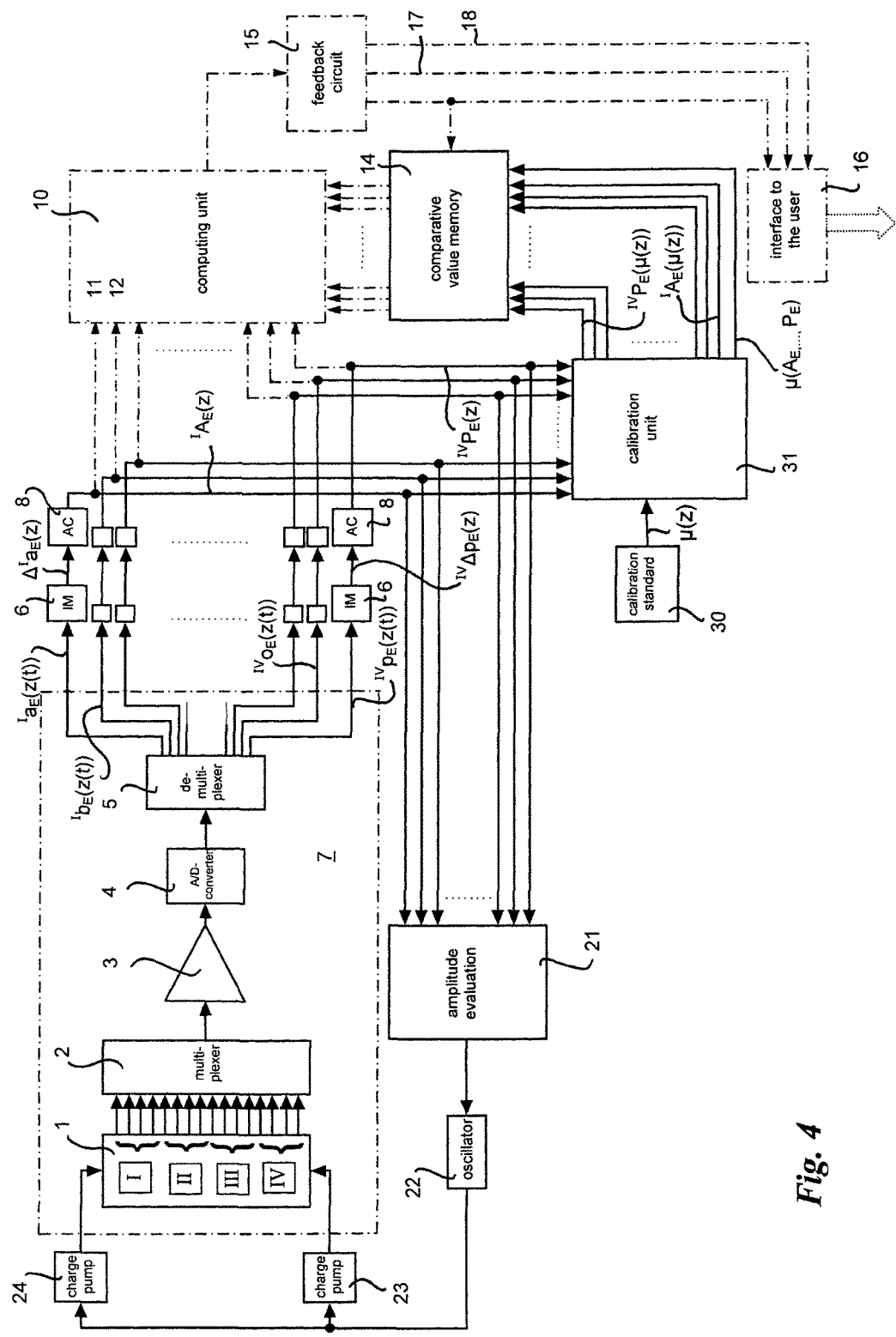
Figure 5:
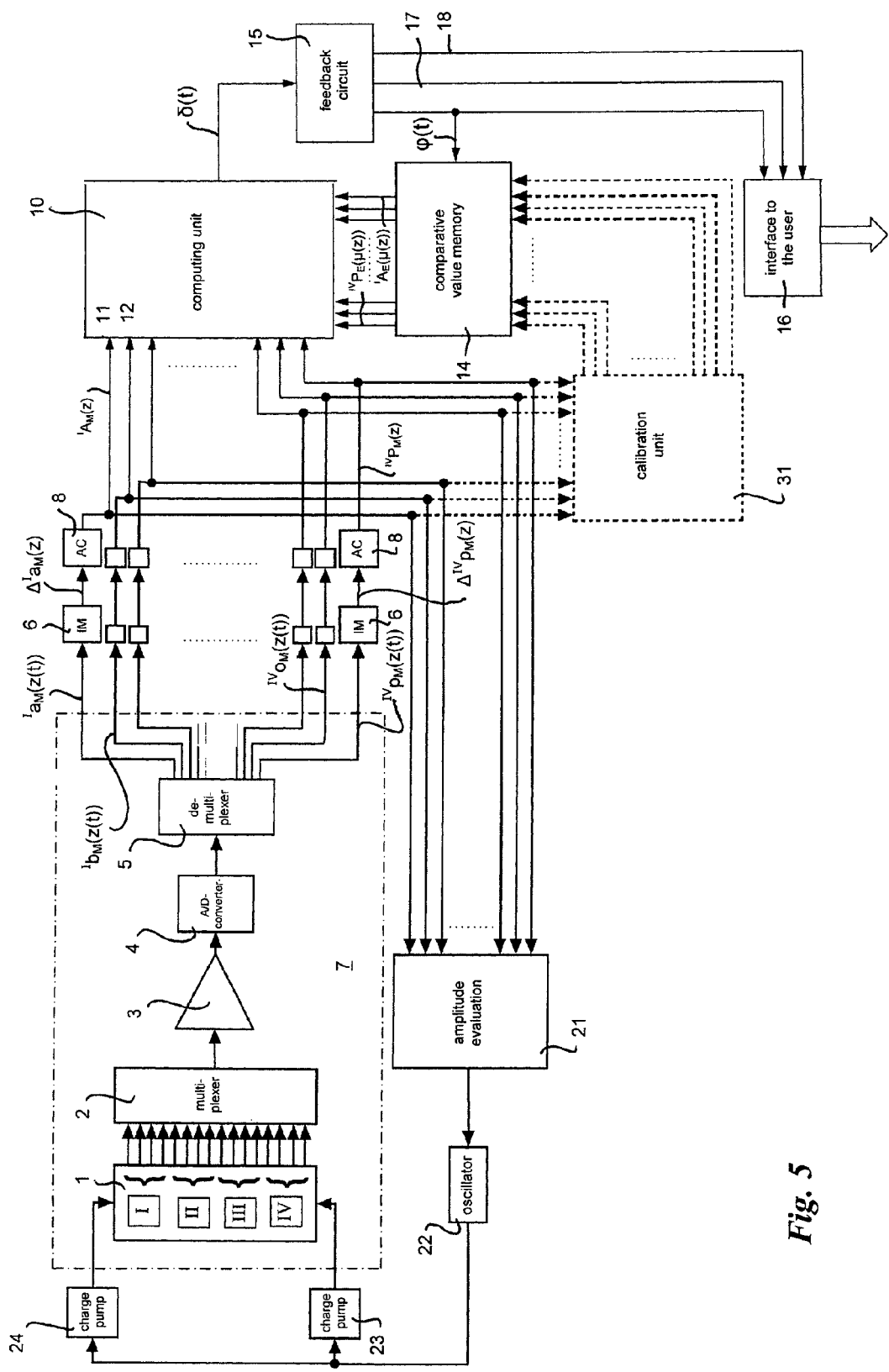
Figure 6:
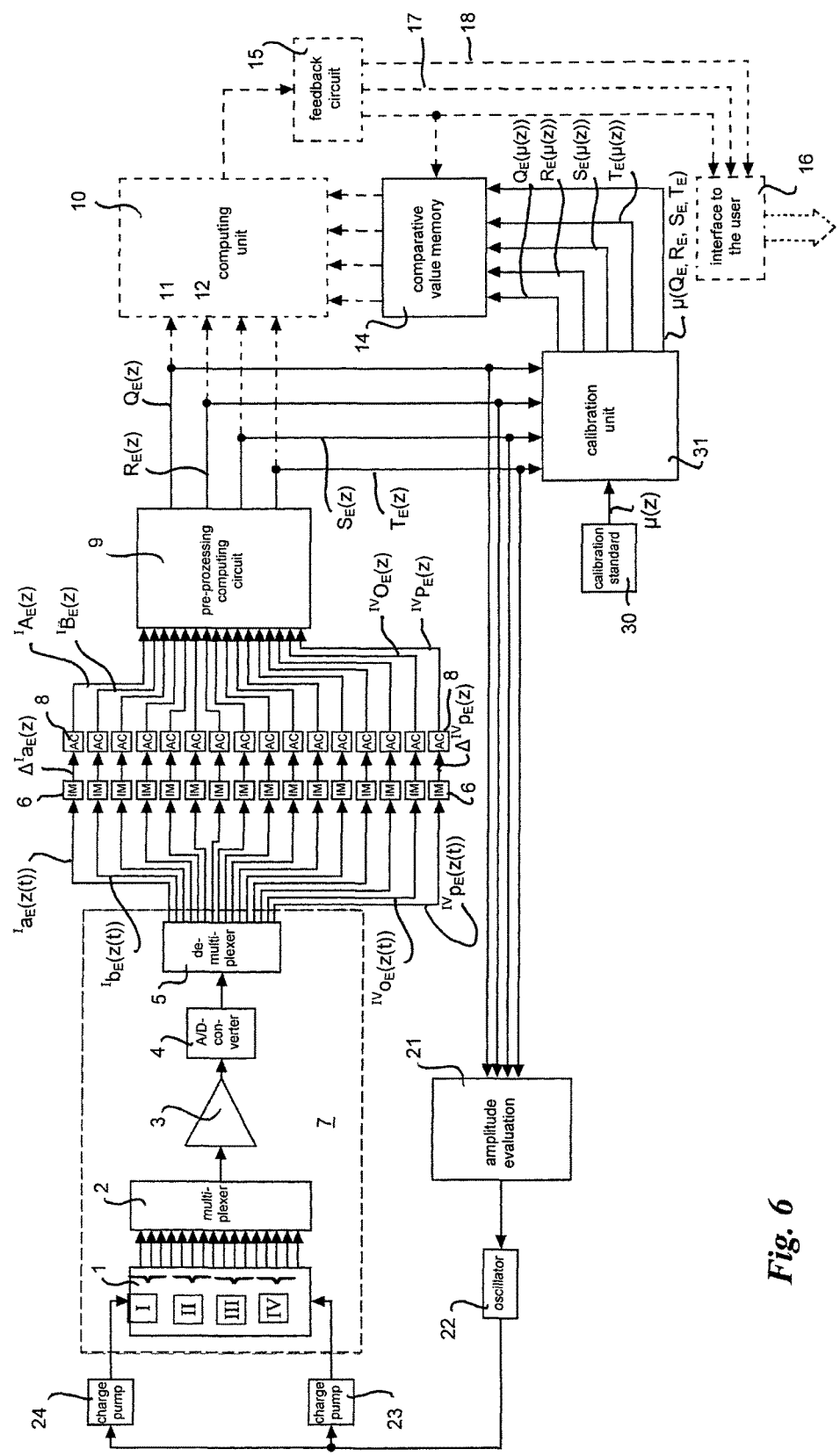
Figure 7:
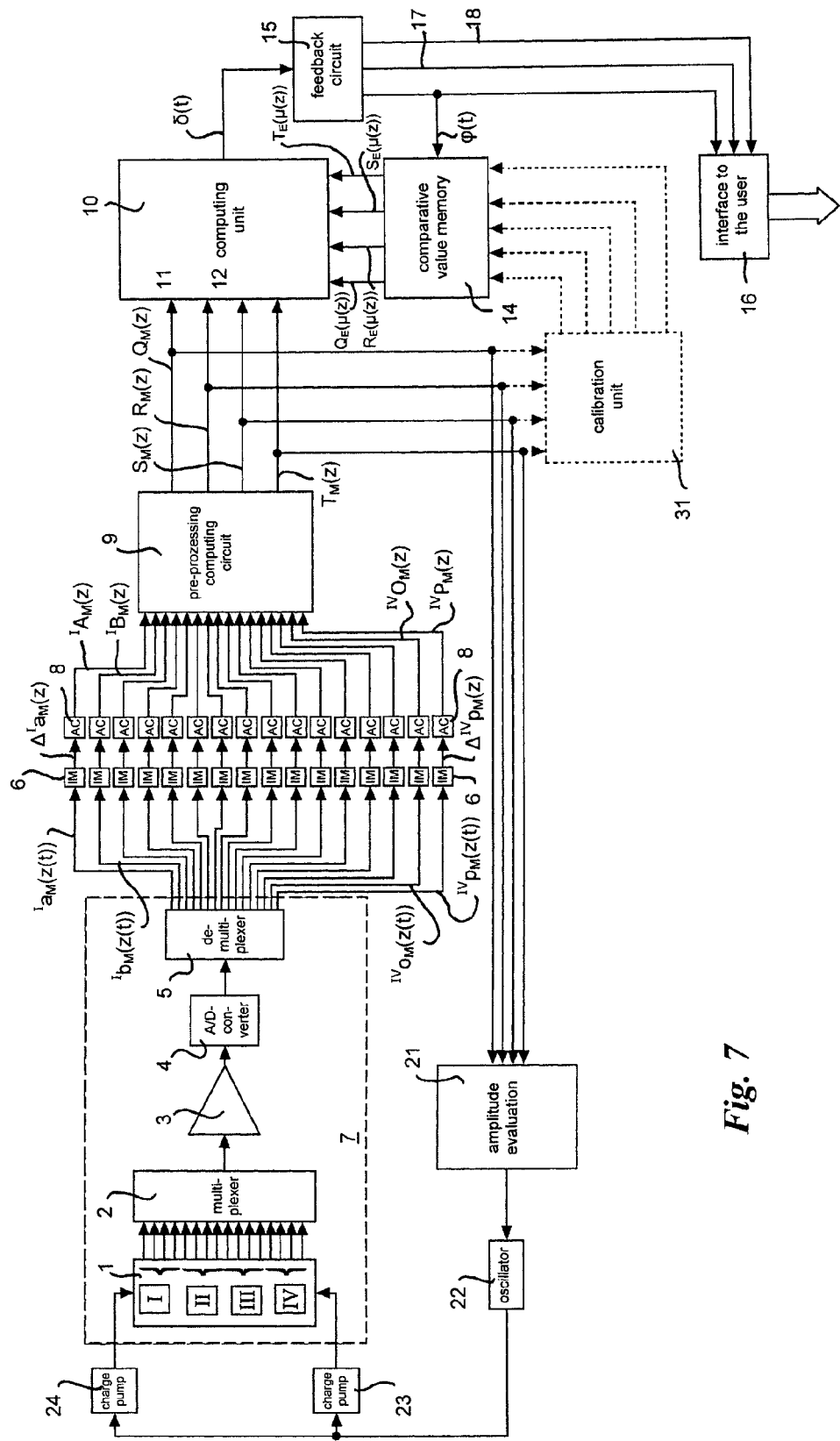
Figure 8:
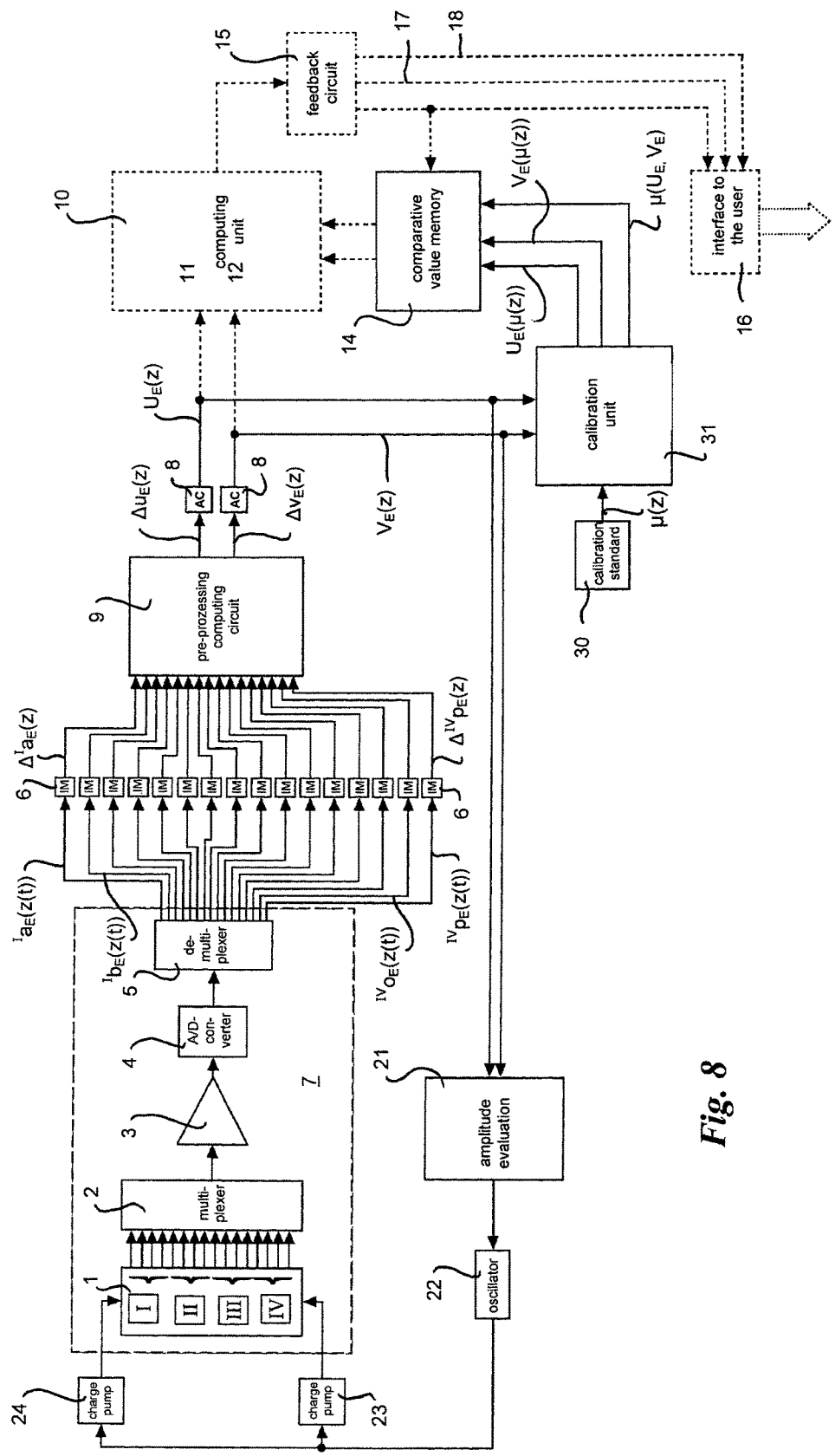
Figure 9:
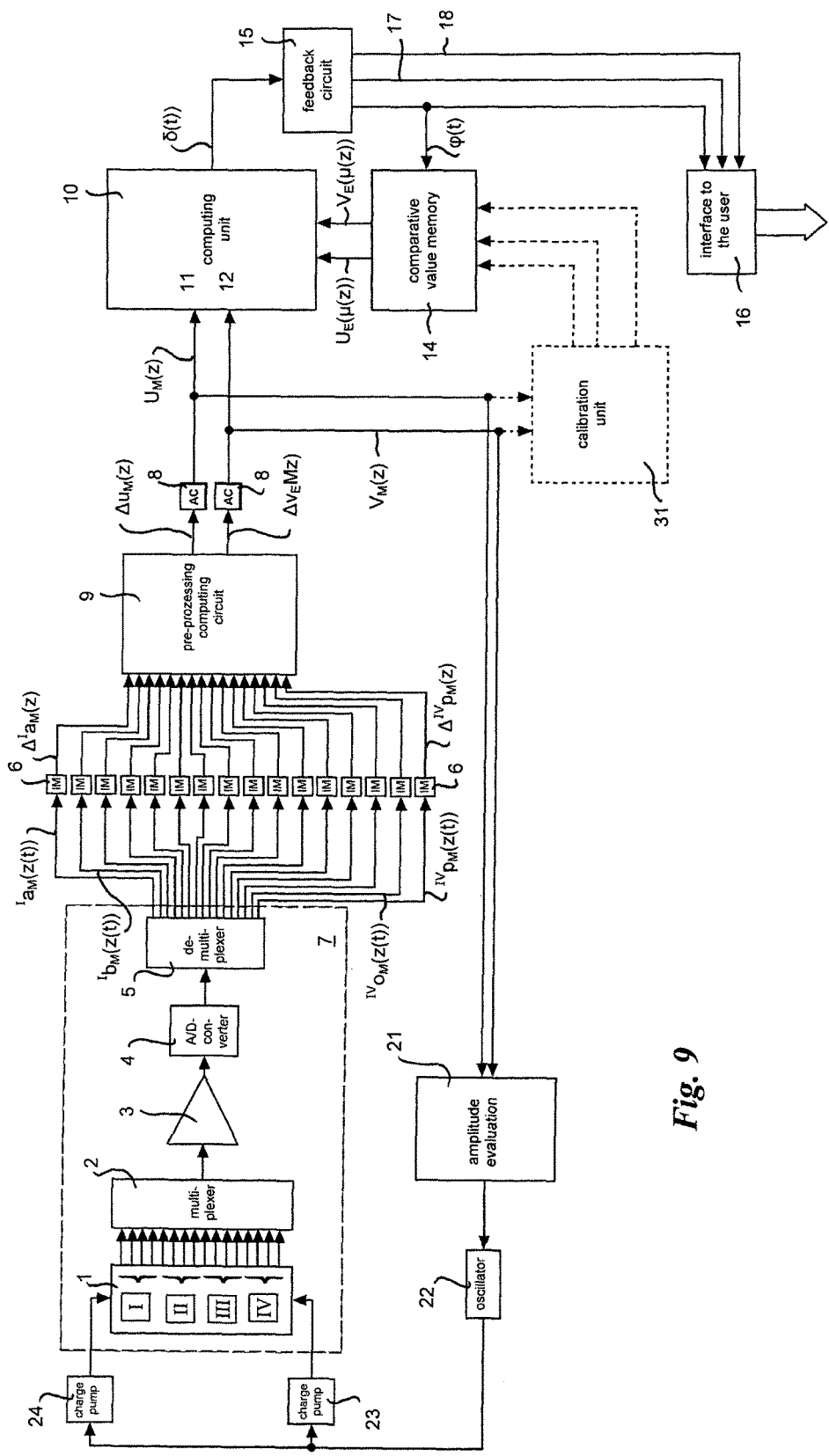
Figure 10:
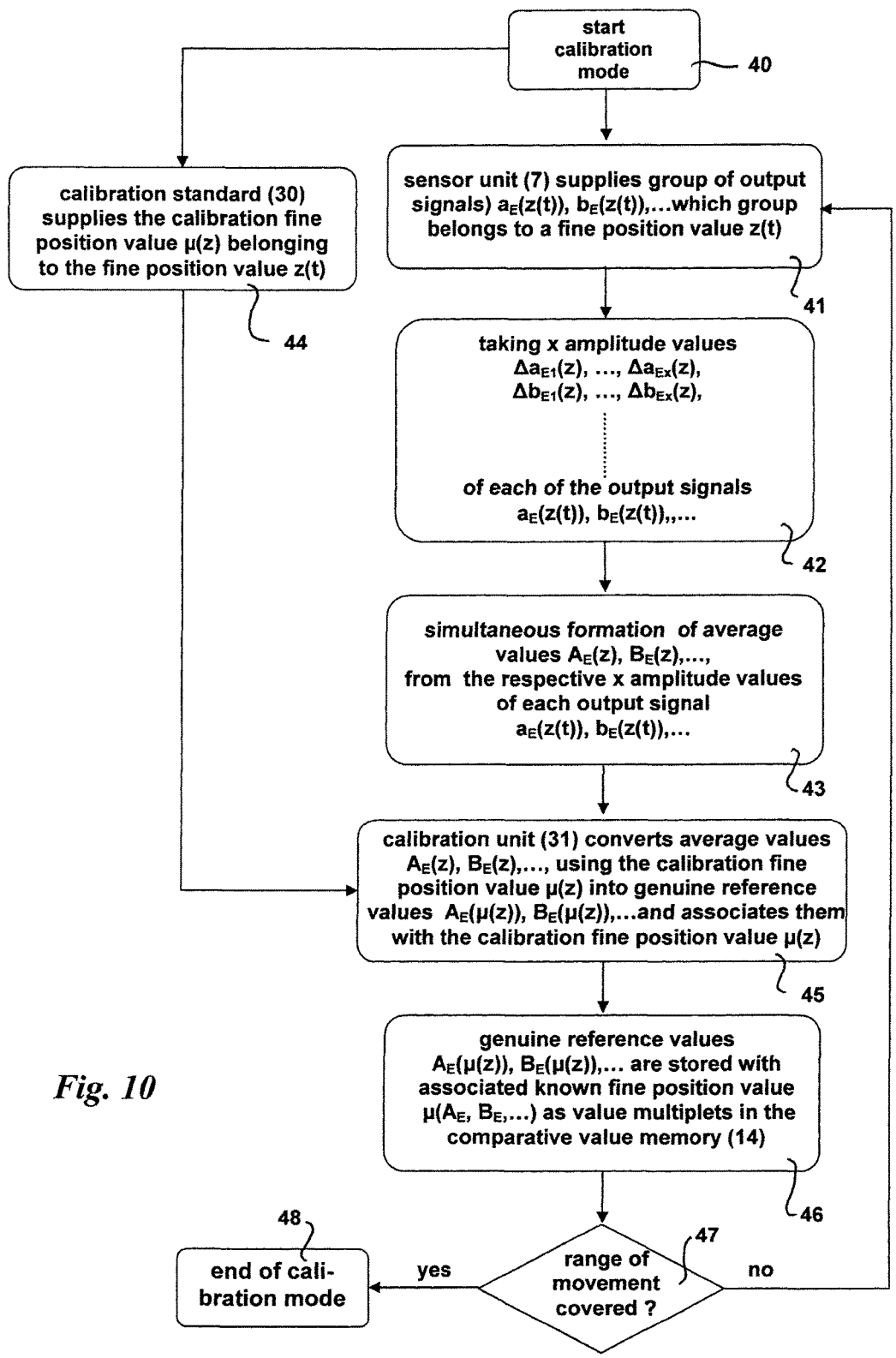
Figure 11:
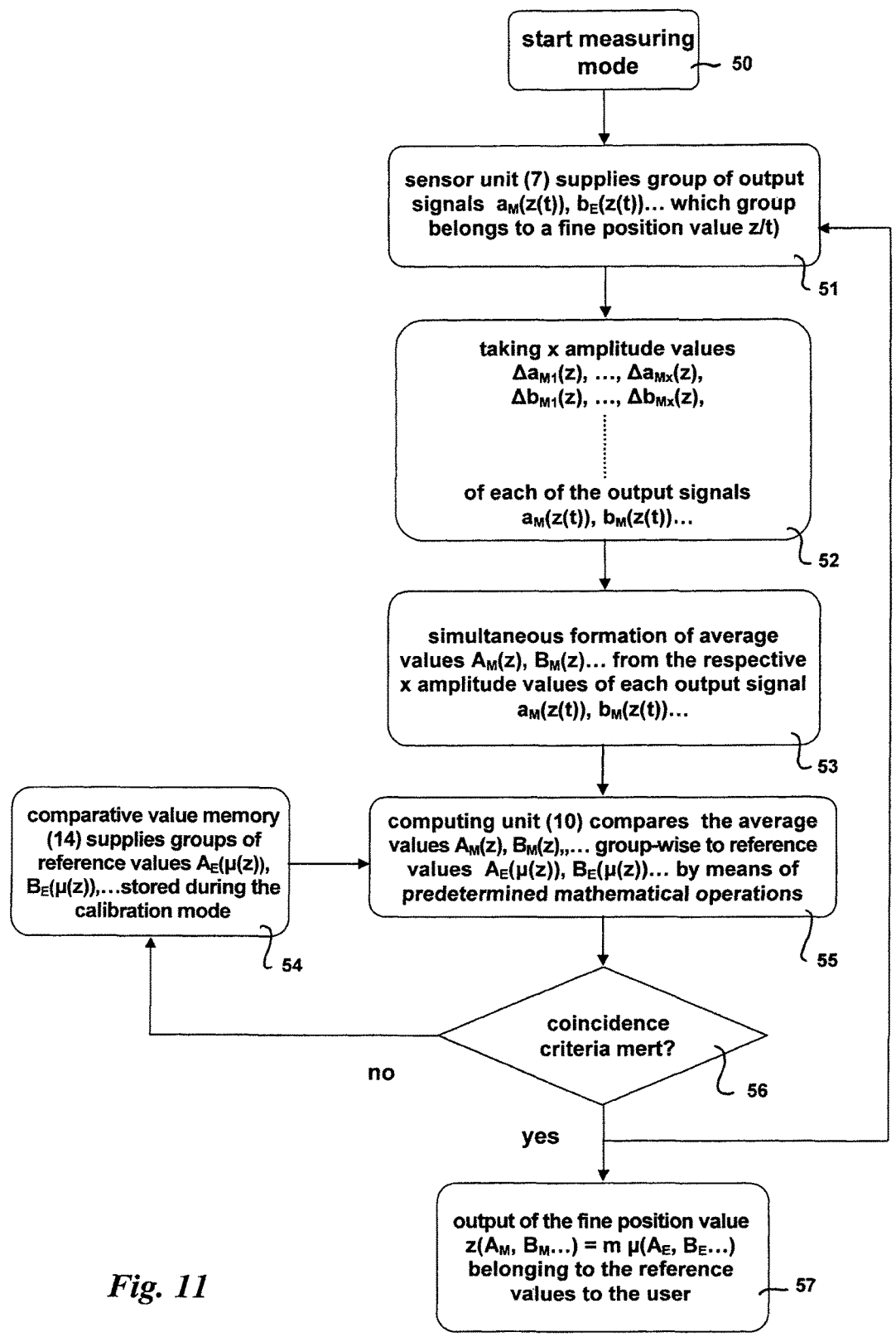

The invention is described hereinafter by means of embodiments by way of example with reference to the drawing in which:

FIG. 1 shows a schematic block circuit diagram of an electronic processing system operating in the calibration mode of a position sensor according to the invention, in which two output signals pre-processed in the sensor unit are evaluated, FIG. 2 shows a schematic block circuit diagram of the electronic processing system of FIG. 1 operating in the measuring mode, FIG. 3 shows a graph representation of the curve shapes plotted in relation to the fine position value z of two pre-processed output signals of the sensor unit, that are evaluated by the electronic processing system of FIGS. 1 and 2, in relation to two adjoining measuring segments, in the calibration mode, FIG. 4 shows a schematic block circuit diagram of an electronic processing system, operating in the calibration mode of a position sensor according to the invention, in which sixteen output signals supplied by the sensor unit are evaluated separately from each other, FIG. 5 shows a schematic block circuit diagram of the electronic processing system of FIG. 4, operating in the measuring mode, FIG. 6 shows a schematic block circuit diagram of an electronic processing system, operating in the calibration mode, of a position sensor according to the invention, in which sixteen output signals supplied by the sensor unit are pre-processed after separate amplification and averaging to afford four signals which in turn are then further evaluated, FIG. 7 shows a schematic block circuit diagram of the electronic processing system of FIG. 6, operating in the measuring mode, FIG. 8 shows a schematic block circuit diagram of an electronic processing system, operating in the calibration mode, of a position sensor according to the invention, in which sixteen output signals supplied by the sensor unit are pre-processed after separate amplification but before averaging to provide two signals which in turn are then further evaluated, FIG. 9 shows a schematic block circuit diagram of the electronic processing system of FIG. 8, operating in the measuring mode, FIG. 10 shows a generalized flow chart of the calibration mode as can be implemented for example with the arrangements shown in FIGS. 1 and 4, and FIG. 11 shows a generalized flow chart of the measuring mode as can be implemented for example with the arrangements shown in FIGS. 2 and 5.

The same units are denoted by the same references in FIGS. 1, 2 and 4 through 9. In FIGS. 1, 4, 6 and 8 for respectively depicting the calibration mode, the circuit portions required only for the measuring mode are denoted by dotted lines. On the other hand, in FIGS. 2, 4, 7, and 9 the external calibration standard 30 is omitted and the calibration unit 31 is shown in dotted lines because it does not operate in the measuring mode. If an internal calibration value generator circuit is used instead of an external calibration standard it is contained in the calibration unit 31. If hereinafter reference is not expressly directed to one of the two operating modes (calibration mode or measuring mode), the respective description then applies equally for both modes of operation. In regard to the addressed signals the indices E and M respectively denoting the calibration mode and the measuring mode respectively are then omitted.

With reference to FIGS. 1 through 3 the basic principle of the invention is described with the simplifying assumption that a sensor unit 7 is used, which delivers only two output signals $a(z(t))$ and $b(z(t)$ which are "phase-shifted" relative to each other in the required fashion. In this respect, and without this being interpreted restrictively, reference is directed to a measuring arrangement described in German patent application DE 10 2009 010 242.6, in particular an arrangement for monitoring the rotary movement of a shaft, in respect of which the exciter unit of the position sensor includes a magnet carrier which is connected to the shaft and which rotates therewith and which carries a series of permanent magnets with alternate orientation of the poles of the magnets so that they are at approximately equal spacings in the direction of rotation and form measuring segments whose length or angular extents are to be finely resolved by the arrangement according to the invention. The shaft and its magnet carrier are not shown in FIGS. 1 and 2.

The signals required for ascertaining the fine position values z of the shaft are supplied by a sensor arrangement 1 which includes for example four Hall elements I, II, III, IV and which are arranged in point form and which are combined in pair-wise relationship, as indicated by the connecting lines between the Hall elements I and II, and III and IV respectively. In that respect each pair is connected in antiserial relationship in such a way that the Hall elements thereof have the magnetic fields of the permanent magnets passing therethrough in opposite directions. Because of the mutually opposite circuitry therefore the signal values resulting from those magnetic fields are added while additive disturbances which are superimposed from the exterior cancel each other out.

Because of for example unequal spacings of the permanent magnets in the direction of movement by each of the stationarily arranged pairs of Hall elements I, II and III, IV, respectively, a semi-periodic signal is delivered when the magnet carrier moves therepast. Equal magnet pole spacings would lead to period signals.

The two analog signals delivered by the pairs of Hall elements I, II and III, IV respectively have to be amplified so that they can be subjected to further processing. Preferably such processing is effected in single-channel mode in order to eliminate the temperature dependency of the offset voltage and the gain factor of the amplifier 3 used. For that purpose the two signals delivered by the pairs of Hall elements I, II and III, IV respectively are passed to a multiplexer 2 which applies them alternately to the input of the amplifier 3. The advantages of such single-channel signal processing are set forth in detail in DE 42 24 225 A1.

To be able to carry out subsequent evaluation in the measuring mode by means of a digitally operating computing circuit 10 the output of the amplifier 3 is connected to the input of an analog/digital converter 4 which digitizes the amplified analog signals alternately supplied thereto. Its output is connected to a demultiplexer 5 which operates synchronously with the multiplexer 2 and thus restores the dual-channel configuration.

The above-described sensor arrangement 1 and circuit portions 2 through 5 jointly form a sensor unit 7 whose output signals $a(z(t))$ and $b(z(t)$ are delivered by the two outputs of the demultiplexer 5.

As both the calibration unit 31 in the calibration mode and also the computing circuit 10 in the measuring mode require the output signals $a(z(t))$ and $b(z(t))$ of the sensor unit 7 for further processing at the same time and—apart from draging error components—in real time, connected downstream of each of the two outputs of the demultiplexer 5 is an intermediate memory (IM) 6 which, from the associated digital output signal $a(z(t))$ and $b(z(t))$ respectively, takes off the instantaneous amplitude value $\Delta a(z)$ and $\Delta b(z)$ respectively and stores same until the respective other digital amplitude value belonging to the same fine position value z is also available.

Those processing steps can be carried out at such a high speed that the time lag caused thereby in respect of one of the two output signals $a(z(t))$ and $b(z(t))$ in relation to the other thereof plays practically no part even in the case of a very fast movement of the body to be monitored and the amplitude values $\Delta a(z)$ and $\Delta b(z)$ respectively which are taken off after single-channel pre-processing are considered as being detected "simultaneously" and can therefore be associated with one and the same fine position value z. On the other hand simultaneity can be produced by intermediate storage.

In principle it would be sufficient to provide an intermediate memory in only one of the two output channels of the demultiplexer 5, but for reasons of identical treatment of the two signals, it is preferable to use two intermediate memories 6. Accordingly a new analog/digital conversion operation can already be started in parallel with the evaluation operation.

For the situation where the sensor arrangement 1 includes sensors which supply signals of such a great amplitude that no amplification is necessary the multiplexer 2, the amplifier 3, the demultiplexer 5 and the two intermediate memories 6 can be omitted. The dual-channel sensor unit 7 then only still includes two analog/digital converters, to which a respective one of the sensor signals is passed and the outputs of which directly supply the output signals a(z(t)) and b(z(t)) of the sensor unit.

In principle the respective true fine position value z is exactly determined by the amplitude values Δa(z) and Δb(z). As however, particularly when using inexpensive sensors, each of the output signals a(z(t)) and b(z(t) can be more greatly noisy than is acceptable for the desired level of measuring accuracy, the obtained amplitudes Δa(z) and Δb(z) of those signals a(z(t)) and b(z(t)) are preferably not passed to the two inputs 11, 12 of the computing circuit 10 in the form of individual measuring values, but in the form of average values A(z) and B(z) previously formed in the averaging circuits (AC) 8.

To achieve a high level of dynamics and, at least when the body to be monitored is not moving extremely fast, a high level of accuracy, it is provided according to the invention that each new average value $A(z)_{new}$ and $B(z)_{new}$ is formed from the previously obtained average value $A(z)_{old}$ and $B(z)_{old}$ and the most recent individual amplitude value Δa(z) and Δb(z) respectively, by a procedure whereby both the old average value $A(z)_{old}$ and $B(z)_{old}$ and also the most recent individual amplitude value Δa(z) and Δb(z) are multiplied prior to summing thereof by a weighting factor $gf_1$ and $gf_2$ respectively and then the resulting sum is divided by the sum of the weighting factors, as is represented in the following equation for the average values A(z):

$$A(z)_{new} = \frac{gf_1 A(z)_{old} + gf_2 \Delta a(z)}{gf_1 + gf_2}$$

A corresponding consideration also applies for formation of the average values $B(z)_{new}$.

Preferably dynamic weighting factors $gf_1$ and $gf_2$ respectively are used in such a way that the weighting factor $gf_1$ belonging to the old average value $A(z)_{old}$ and $B(z)_{old}$ respectively is selected to be correspondingly smaller, and the weighting factor $gf_2$ belonging to the most recent individual amplitude value Δa(z) and Δb(z) respectively is selected to be correspondingly greater, the greater the difference between the old average value $A(z)_{old}$ and $B(z)_{old}$ respectively and the most recent individual amplitude value Δa(z) and Δb(z) respectively is, wherein the sum of the weighting factors $gf_1+gf_2$ is preferably kept constant.

The intermediate memories 6 and the averaging circuits 8 disposed downstream thereof can be combined with the computing circuit 10 and the calibration unit 31 to afford a single computing unit, for example a μ-controller. Here however they are shown as separate circuits for the sake of clarity.

In the calibration mode the pairs of average values $A_E(z)$, $B_E(z)$ are fed to the calibration unit 31 which, because of the defined coupling between the exciter unit and the calibration standard 30, receives from the latter the calibration fine position value μ(z) respectively belonging to each of those pairs, with the use of which it transposes them into associated value triplets consisting of genuine reference values $A_E(\mu)$ and $B_E(\mu)$ as well as the associated true fine position value μ($A_E$, $B_E$), and stores them in the comparative value memory 14, while maintaining their correlation. A less preferred alternative provides that the quotients $A_E(\mu)/B_E(\mu)$ are formed and are stored in a comparative value memory, while retaining the correlation, together with μ($A_E$, $B_E$). In any case the calibration steps are repeated for a plurality of fine position values z which preferably uniformly cover the entire range of movement of the body.

To ascertain an instantaneous fine position value z which is of interest in the measuring mode the computing circuit 10 compares the respective average values $A_M(z)$, $B_M(z)$ to the genuine reference values $A_E(\mu(z))$ and $B_E(\mu(z))$ of the value triplets $A_E(\mu(z))$, $B_E(\mu(z))$ stored in the comparative value memory 14 on the basis of the computing operation:

$$\delta(t)=A_M(z)B_E(\mu(z))-B_M(z)A_E(\mu(z)),$$

preferably in a closed loop control arrangement in which associated $A_E(\mu(z))$ and $B_E(\mu(z))$ are varied in relation to μ in such a way that δ(t) goes towards zero.

For that purpose the output signal δ(t) of the computing unit 10 is fed to a feedback circuit 15 which forms the argument φ(t) which is fed to the comparative value memory 14 as an input signal. The feedback circuit 15 checks whether δ(t) is larger than, smaller than or equal to 0 and, having regard to the sign of δ(t), alters the value of φ(t) by single or several increments until the condition δ(t)=0 is met at least with sufficient accuracy, as was already described hereinbefore.

As soon as the condition δ(t)=0 has been reached by a suitable change in φ(t) which is effected by the feedback circuit 15 the true fine position value μ($A_E$, $B_E$) which belongs to the pair of reference values $A_E(\mu)$ and $B_E(\mu)$ in question and which is stored in the comparative value memory 14, with rigid coupling of exciter unit and calibration standard, is set equal to the fine position value z being sought (φ=μ=z) and φ is delivered to an interface 16 which leads to the user of the position values and at which therefore the genuine values of the calibration standard appear.

The interface 16 receives from the feedback circuit 15 by way of the lines 17 and 18 the incremental signal serving to change the input value φ(t) of the comparative value memory 14 and the sign of the output value δ(t) of the computing circuit 10 from which information concerning the direction and speed of the movement of the body to be monitored can be directly obtained.

Alternatively it is possible to perform a plurality of division operations in accordance with the relationship:

$$A_M(z)/B_M(z) <> A_E(\mu)/B_E(\mu)$$

and in that case to vary μ until that inequality becomes an equality. That however is generally mathematical problematical (for example a division by 0 has to be avoided) and is substantially more time-consuming.

In addition FIGS. 1 through 9 show an amplitude evaluation circuit 21 to which the individual signal amplitudes appearing at the outputs of the averaging circuits 8 are best fed, as input signals. Instead the input signals of the amplitude evaluation circuit 21 could also be taken off downstream of the intermediate memories 6 or downstream of the demultiplexer 5.

For measuring the fine position values z in particular with a high degree of accuracy it is not necessary according to the invention for the output signals a(z(t)) and b(z(t)) of the sensor unit 7 to be of a sine or cosine form.

As no particularly high level of accuracy is required however for the control, described hereinafter, of the voltage supply of the sensors 1, it can be assumed for this purpose that those output signals a(z(t)) and b(z(t)) approximately comply with the formulae $$a(z(t)) = \hat{A}_{mp} \sin z(t)$$

and $$b(z(t)) = \hat{A}_{mp} \cos z(t)$$

wherein $\hat{A}_{mp}$ is the peak value of those signals. Then in a first approximation in accordance with the equation:

$$\hat{A}_{mp}^2 (\sin^2 z(t) + \cos^2 z(t)) = \hat{A}_{mp}^2$$

the peak value $\hat{A}_{mp}$ can be ascertained independently of the instantaneous fine position value z in that the amplitude evaluation circuit 21 squares each of the input signals fed thereto and calculates the roots from the sum of those squares.

The amplitude value obtained in that way is passed to a voltage-controlled oscillator 22 actuating two charge pumps 23, 24 which regulate the lower and the upper voltage levels of the current/voltage supply of the sensors 1 in such a way that optimum adaptation of the sensor signal voltage range to the input voltage range of the downstream-disposed circuit arrangement is achieved, which is preferably an IC-component which includes all circuit units 2 through 10, 14 through 16 and 20 through 22.

Alternatively thereto amplitude average values can also be detected by means of integrals, respectively formed over a defined measuring segment, of the amplitude values of one of the two output signals, and can be fed to the voltage-controlled oscillator 22.

Charge pumps are known to the man skilled in the art. They involve a kind of dc voltage/dc voltage converter, in relation to which capacitors are used as energy storage means to produce either a higher or a lower output voltage from an input voltage. They can be constructed from simple and inexpensive components.

Charge pumps use electronic switches which control the feed of charge to and the taking of charge from capacitors and which in the present arrangement are actuated in the required manner by the voltage-controlled oscillator.

FIG. 3 in which the left-hand ordinate stands for amplitude values and the right-hand one stands for calibration fine position values μ, shows the possible curve configurations of two output signals a(z) and b(z) which can be readily processed by the method according to the invention over two measuring segments MS1 and MS2 in the calibration operation, in relation to the fine position values z plotted on the abscissa. For the sake of simplified illustration consideration is given here to idealized, namely noise-free output signals a(z) and b(z), for which the averaging operation (which in practice is unavoidable) is not required.

The beginning and the end of each measuring segment are defined by the zero crossings of one of the two curves, here the curve a(z), in relation to which the zero crossings of the curve b(z) have a phase shift. For that reason the two curves are also referred to as being "semi-periodic". The phase shift between the zero crossings of the two curves, presupposing a mechanically stable sensor arrangement, is the same over the entire working range.

As will be seen the measuring segment MS1 is markedly longer than the measuring segment MS2 and the two curve forms a(z) and b(z) are of greatly different shapes. It will be noted however that they intersect only once in each of the two measuring segments so that this involves the "simple case" already mentioned above. The further configuration of the two curves adjoining the right-hand measuring segment, can be different from that in the measuring segments MS1 and MS2.

The calibration fine position value μ is preferably exactly proportional to z, and can therefore be represented by a straight line which extends over the two measuring segments MS1 and MS2 and which rises with the gradient 1/m and which at the transition of the measuring segment MS2 to the next measuring segment jumps back again to the zero value in order from there to rise linearly again over the following two measuring segments in the same manner as is shown for the two measuring segments MS1 and MS2.

Shown in the right-hand measuring segment MS2 is a measuring moment $t_v$ in which the amplitude values Δa(z) and Δb(z) are taken off for the above-described further processing operation, to which belongs the calibration fine position value μ(a, b) which was associated with them during the calibration operation and stored so that it can be outputted as a measuring value for the fine position of the body when those two amplitude values Δa(z) and Δb(z) occur in the measuring mode.

In respect of the embodiment described with reference to FIGS. 1 through 3 it was assumed that the sensor arrangement 1 includes four Hall elements I, II, III, IV which are so arranged in the magnetic field of the exciter unit that the Hall elements of each pair see magnetic fields to be measured of opposite direction (anti-serial connection) so that each pair delivers a signal from which additively superimposed interference field components are eliminated.

The degree of accuracy which can be achieved thereby is however not sufficient in many cases for two reasons:

On the one hand, with certain field configurations, there is the danger that the two Hall elements which are connected together in hardware terms, that is to say invariably fixedly, of each pair, do not have exactly identical field components passing therethrough, whereby the measuring result can be falsified.

On the other hand, for cost reasons, it is preferable for the Hall elements to be produced on the top side of an integrated circuit chip on which essential parts of the electronic signal processing and evaluation means are disposed. Piezoelectric effects and different crystal structures then cause stress effects at the Hall elements, leading to an offset of the Hall elements, so that their output signals involve different amplitude values even when they have identical magnetic field strengths passing therethrough; the error occurring as a result is referred to here as an "electric measuring error".

To overcome the last-mentioned problems it is advantageous to obtain four individual signals in very rapid succession from each of the Hall elements I, II, III, IV by its signal take-off connections being cyclically interchanged with the power supply connections and by the positive and negative poles of the latter being interchanged with each other in each of those configurations. Each of the analog individual signal voltage values produced thereby in rapid succession is amplified and put into intermediate storage in a sample-and-hold circuit until all four individual signal voltage values of an interchange cycle are present, which in correct sign relationship are summed to give a signal delivered by the Hall element I or II or III or IV in question so that the interference components caused by the Hall element itself drop out. If a specific processing channel with amplifier is used however for amplification and intermediate storage of each of the four individual signals, as is hitherto usual, new, often greater errors which cannot be eliminated can be caused by different offset voltages and temperature drift phenomena of the four processing channels belonging to each individual Hall element I, II, III, IV.

To be able to operate in highly precise fashion it is therefore provided according to the invention not to provide fixed wirings in respect of the four Hall element I, II, III, IV used, but to derive from the sixteen individual signal amplitude values taken off directly thereat, by virtue of single-channel pre-processing, a corresponding number of digital output signals $^{I}a(z(t))$, $^{I}b(z(t))$, ..., $^{IV}p(z(t))$ of the sensor unit 7 as is the case with the embodiments in FIGS. 4 through 9. In that respect the superscript Roman numerals I through IV preceding the signal identifications indicate from which of the four Hall elements I, II, III, IV the signal in question originates.

As can be seen from these Figures it is not just two but 16 Hall probe signals that are respectively passed to the multiplexer 2, which applies them cyclically continuously to the amplifier 3, the output of which has the analog/digital converter 4 connected downstream thereof. The multiplicative disturbances impressed by those circuit portions pass into all sixteen signals in the same manner and can therefore be eliminated by later quotient formation.

The demultiplexer 5 applies the signals derived from the Hall probe signals in single-channel relationship as output signals $^{I}a(z(t))$, $^{I}b(z(t))$, ..., $^{IV}p(z(t))$ of the sensor unit 7 to sixteen mutually parallel output lines, each of which leads to an intermediate storage means 6 which in clocked relationship takes off an instantaneous amplitude value from the output signal, fed thereto, of the sensor unit 7, and puts it into intermediate storage until all sixteen digital output signal amplitude values $\Delta^{I}a(z)$, $\Delta^{I}b(z)$, ..., $\Delta^{IV}p(z)$ belonging to a single fine position value z are simultaneously available for further processing.

That can be effected in different ways:

In the example shown in FIGS. 4 and 5, an average value $^{I}A(z)$, $^{I}B(z)$, ..., $^{IV}P(z)$ is formed simultaneously from each of the sixteen amplitude values $\Delta^{I}a(z)$, $\Delta^{I}b(z)$, ..., $\Delta^{IV}p(z)$ in a dedicated averaging circuit (AC) 8 in the same manner as was already described with reference to FIGS. 1 and 2.

Those average values $^{I}A(z)$, $^{I}B(z)$, ..., $^{IV}P(z)$ are then fed in unlinked relationship, that is to say parallel, in the calibration mode (FIG. 4) to the calibration unit 31 and in the measuring mode (FIG. 5) to the computing unit 10, where they are suitably processed or evaluated as was described in connection with the embodiment of FIGS. 1 and 2 for only two such average values A(z) and B(z). The cross product differences are here respectively formed from sixteen reference values $^{I}A_E(\mu)$, $^{I}B_E(\mu)$, ..., $^{IV}P_E(\mu)$ and sixteen measuring values $^{I}A_M(z)$, $^{I}B_M(z)$, ...$^{I}P_M(z)$ and are varied until they have approached the value zero at least with adequate accuracy. When that condition is reached the true fine position value $\mu(A_E, B_E, ..., P_E)$ which belongs to the reference value group in question and which is stored in the comparative value memory 14 is recognized as the current argument $\phi$ ($\phi=\mu$) and is ascertained and outputted as the current fine position value z=m μ.

In the embodiment in FIGS. 6 and 7 also a corresponding average value $^{I}A(z)$, $^{I}B(z)$, ..., $^{IV}P(z)$ is respectively formed from each of the sixteen amplitude values $\Delta^{I}a(z)$, $\Delta^{I}b(z)$, ..., $\Delta^{IV}p(z)$ when all are available for simultaneous processing, from rapidly successive $\Delta^{I}a_1(z)$ through $\Delta^{I}a_x(z)$, $\Delta^{I}b_1(z)$ through $\Delta^{I}b_x(z)$ etc to $\Delta^{IV}p_1(z)$ through $\Delta^{IV}p_x(z)$. Those average values are however here passed to a pre-processing computing circuit 9 in which the average values originating from a respective Hall element I, II, III, IV are thus linked to form a single output average value Q(z) or R(z) or S(z) or T(z) respectively so that the electric offset errors of the Hall elements are eliminated. The essential difference in relation to the linking depicted in relation to FIGS. 1 and 2 of analog Hall element signals which are separately amplified and put into intermediate storage is that amplification and digitization occurs in a single processing channel common to all sixteen signals so that the errors caused by that channel are impressed on all signals in the same manner and are invariable after the digitization operation so that they can be eliminated in suitable processing by difference formation.

Thus, as in the above-described variants, they are passed in the calibration mode (FIG. 6) to the calibration unit 31 and in the measuring mode (FIG. 7) to the computing unit 10, where they are suitably processed and evaluated. The cross product differences are here respectively formed from four related reference values $Q_E(\mu)$, $R_E(\mu)$, $S_E(\mu)$ and $T_E(\mu)$ and four related measuring values $Q_M(z)$, $R_M(z)$, $S_M(\mu)$ and $T_M(z)$ and varied until they have approached the value zero at least with adequate accuracy. When that condition is reached the true fine position value $\mu(Q_E, R_E, S_E, T_E)$ which belongs to the reference value group in question and which is stored in the comparative value memory 14 is recognized as the current argument $\phi$ ($\phi=\mu$) and ascertained and outputted as the current fine position value z=m μ.

That can be effected for example in accordance with one of three possible formulae of which two are specified here:

$$[Q_E(\mu(z))-R_E(\mu(z))][S_M(z)-T_M(z)]-[Q_M(z)-R_M(z)][S_E(\mu(z))-T_E(\mu(z))]$$

or $$[Q_E(\mu(z))-T_E(\mu(z))][S_M(z)-R_M(z)]-[Q_M(z)-RT_M(z)][S_E(\mu(z))-R_E(\mu(z))]$$

The third is afforded by a further permutation of the signals Q, R, S and T.

A corresponding consideration also applies to the embodiment of FIGS. 8 and 9 which also differs from that of FIGS. 6 and 7 in that here the averaging operation is not effected for the input signals but for the output signals of the pre-processing computing circuit 9. The essential difference here however is that both the electric measuring errors and also errors due to extraneous field disturbances are already eliminated in the pre-processing operation and thus a simple final processing procedure is achieved.

In accordance with the invention individual processing steps of the methods described with reference to drawings 1, 2 and 4 through 9 can be combined together in the most widely varying suitable variations.

In the above-described embodiments sensor arrangements 1 having four Hall elements I, II, III, IV have been respectively described. The method according to the invention however can also be performed with only three Hall elements which then for example supply twelve signals to be processed. Alternate pair formation can be effected to form the cross products. The general form of a cross product is afforded by multiplication of one or more elements of the reference value group with one or more elements of the measuring value group being effected.

The signal processing procedure which is generally performed here by means of pre-processing and/or cross products involves the basic concept that all interference factors can be eliminated by ratiometric processing of difference values, as is described in above-mentioned DE 42 24 225 A1.

The flow chart in FIG. 10 which is kept in general terms, that is to say which is not fixed to a given number of output signals from the sensor unit 7, shows the most essential steps in the calibration mode.

After the START 40 the exciter unit, which is for example mechanically rigidly coupled to the calibration standard 30, of the position sensor according to the invention, over its range of movement, passes through a plurality of positions which are respectively identified by a fine position value z and at each of which the sensor unit 7, in the step 41, supplies a group of associated output signals $a_E(z(t))$, $b_E(z(t))$, . . . which depending on the respective embodiment can include for example two, three, four, twelve or sixteen signals.

In step 42 there are successively taken from each of the output signals $a_E(z(t))$, $b_E(z(t))$, . . . x amplitude values $\Delta a_{E1}(z)$, . . . , $\Delta a_{Ex}(z)$, $\Delta b_{E1}(z)$, . . . $\Delta b_{Ex}(z)$, . . . , from which then an average value $A_E(z)$, $B_E(z)$, . . . is formed in step 43 simultaneously for each of the output signals $a_E(z(t))$, $b_E(z(t))$, . . . . In that case x at least in the start-up phase must be greater than 1 because in the course of further operation it is generally sufficient for each new average value $A_E(z)_{new}$, $B_E(z)_{new}$ . . . to be formed from the previously obtained average value $A_E(z)_{old}$, $B_E(z)_{old}$ . . . and a single new individual amplitude value $\Delta a_E(z)$, $\Delta b_E(z)$ . . . by both the old average value $A_E(z)_{old}$, $B_E(z)_{old}$, . . . and also the newest individual amplitude value $\Delta a_E(z)$, $\Delta b_E(z)$, prior to summing thereof, being respectively multiplied by a weighting factor $gf_1$ and $gf_2$ respectively and then the resulting sum being divided by the sum of the weighting factor, x can therefore be equal to 1.

In parallel with the above-described operations the calibration standard 30 in step 44 delivers the calibration fine position value $\mu(z)$ corresponding to the fine position value z(t) in question to the calibration unit 31 which also acquires the average values $A_E(z)$, $B_E(z)$, . . . formed in step 43 and converts those in step 45, using that calibration fine position value $\mu(z)_f$, into genuine reference values $A_E(\mu(z))$, $B_E(\mu(z))$, . . . and associates same with the calibration fine position value $\mu(z)$.

In step 46 the genuine reference values $A_E(\mu(z))$, $B_E(\mu(z))$, . . . together with the associated calibration fine position value $\mu(A_E, B_E, \ldots)$ are stored as a values multiplet in the comparative value memory 14.

Step 47 involves querying whether the entire range of movement has been covered. If "yes" the calibration mode is terminated (block 48), otherwise the method goes back to the step 41 in order to process the group of output signals $a_E(z(t))$, $b_E(z(t))$, . . . which belongs to the next fine position value z(t) and which is delivered by the sensor unit 7 in the above-described manner so that a "library" of stored values multiplets is progressively formed in the comparative value memory, which approximately uniformly cover the entire range of movement of the body to be monitored.

In the flow chart shown in FIG. 11 steps 51 through 53 take place entirely similarly to steps 41 through 43 in the calibration mode, except that here the signals to be processed bear the index letters M to make it clear that it is now the measuring mode that is being implemented.

After the step 53 the average values $A_M(z)$, $B_M(z)$, . . . are however not passed to the calibration unit 31 but to the computing unit 10 which at the same time for that purpose receives a first group of reference values $A_E(\mu(z))$, $B_E(\mu(z))$, . . . from the comparative value memory 14 (step 54).

In step 55 the computing unit 10, on the basis of predetermined mathematical operations, in particular by the formation of cross products, compares the applied average values $A_M(z)$, $B_M(z)$, . . . to the reference values $A_E(\mu(z))$, $B_E(\mu(z))$, . . . delivered from the comparative value memory 14. If a predetermined coincidence criterion is met (answer "yes" to step 56), for example the cross product from average values $A_M(z)$, $B_M(z)$, . . . and reference values $A_E(\mu(z))$, $B_E(\mu(z))$, . . . is equal or approximately equal to zero the current fine position value $z(A_M(z), B_M(z), \ldots)$ is calculated in accordance with the equation z=mea from the calibration fine position value $\mu(A_E, B_E, \ldots)$ belonging to the values multiplet of the instantaneously applied group of reference values $A_E(\mu(z))$, $B_E(\mu(z))$, . . . and delivered to the user. The method then goes back to step 51 and again takes over from the sensor unit 7 a group of output signals $a_M(z(t))$, $b_M(z(t))$, . . . which can belong to the same fine position value z(t) if the body is not moving, or to a new fine position value z(t) describing a new position.

If the criterion 56 gives the answer "no" then the method goes back to step 54, that is to say the comparative value memory delivers the next values multiplet to the computing unit 10 which performs a renewed comparison with the measuring values or average values $A_M(z)$, $B_M(z)$, . . . which are still applied.

The loop 55, 56, 54 is implemented until the criterion gives the answer "yes" and the method, as described, on the one hand in step 57 can deliver the ascertained fine position value z=m μ to the user and on the other hand can go back to step 51 to take over a new group of output signals $a_M(z(t))$, $b_M(z(t))$, . . . of the sensor unit 7 and ascertain therefrom a new fine position value z in the described manner.

The positions of the Hall elements I, II, III, IV shown in the drawings are to be interpreted only diagrammatically. In practice the four Hall elements of a sensor arrangement are preferably disposed on the corners of a square. In a sensor with three Hall elements they can be arranged on the corners of a triangle or on a straight line as is described in German patent application No 10 2010 050 356.8 which is not a prior publication and the technical content of which is incorporated in its entirety here by reference.

Instead of the Hall elements which have been primarily mentioned hitherto it is also possible to employ other magnetosensitive sensors, in particular GMR sensors (GMR=giant magnetic resistance).

The invention claimed is:

1. A method of ascertaining a fine position value describing the instantaneous absolute position of a movable body, said method comprising the step of providing a position sensor which comprises:
   an exciter unit which moves with said movable body and which can pass through a predetermined range of movement, said range comprising at least one measuring segment;
   a stationary sensor unit (7) adapted to generate a plurality of output signals which jointly describe the variation in time of said fine position value;
   signal processing means adapted to receive said output signals and, at predeterminable points of time, to derive from said output signals average values jointly describing said fine position value of said body at a respective point of time,
   wherein said position sensor further comprises:
      a comparative value memory (14) adapted to store reference values;
      a computing unit (10) adapted to compare said average values with said reference values;
      a calibration unit (31) adapted to receive said average values; and a regulating loop consisting of said computing unit (10), said comparative value memory (14) and a feedback circuit (15), and wherein said method further comprises the following steps:

performing at least one calibration run for calibrating said position sensor, said calibration run comprising the sub-steps of additionally providing a calibration standard (30) comprising a movable scale which also moves with said movable body and, being in a defined relationship with the exciter unit of the position sensor, passes through a corresponding predetermined range of movement; and a stationary detector adapted to sense said movable scale and to generate a calibration fine position value signal representing the variation in time of the instantaneous position of said movable body with high accuracy;

sampling said calibration fine position value signal at predeterminable points of time to obtain calibration fine position values representing said fine position value of said body at the respective point of time and, at each of said points of time, simultaneously sampling said output signals delivered by said stationary sensor unit (7) in order to obtain associated average reference values feeding each of said calibration fine position values and the associated average reference values to said calibration unit (31), which puts them together to form multiplets of associated values having a defined relationship and stores said multiplets in said comparative value memory (14) in a retrievable manner;

operating after said calibration run said position sensor without said calibration standard (30) in a measuring mode for ascertaining the current fine position value by the following sub-steps:

feeding the output signals of sensor unit (7) to said signal processing means which derive from said output signals average measurement values;

feeding said average measurement values to said computing unit (10);

causing said comparative value memory (14) under the control of said feedback circuit (15) to feed a set of average reference values to said computing unit (10) which compares said average reference values with said average measurement values by forming cross products for each set of average reference values and determines the magnitude of the differences of such cross products;

repeating that last sub-step under the control of said feedback circuit (15) until said differences have reached a value closest to zero; and identifying the associated fine position value as being the fine position value of the instantaneous absolute position of said movable body.

2. A method as set forth in claim 1 wherein said method further comprises the step of providing signal processing means being adapted to derive average values from said output signals by the following sub-steps:

sampling each of said output signals several times at points of time using a high scanning clock frequency such that the position of the body to be monitored does not markedly change during said sampling procedure to obtain groups of individual amplitude values;

forming a first average value from a predetermined number of previously ascertained individual amplitude values;

providing said first average value with a first weighting factor and providing the latest individual value with a second weighting factor; and forming a new average value from those two weighted values.

3. A method as set forth in claim 1 wherein the step of providing a position sensor comprises providing a stationary sensor unit (7) delivering two output signals from which by said signal processing means two average values are derived so that, during the calibration step, triplets of associated values are generated an stored in said comparative value memory (14) each triplet comprising one calibration fine position value and two associated average reference values; and wherein, in the measuring mode, the comparison of said two average reference values and said two average measurement values performed by said computing unit (10) comprises the sub-steps of forming cross products and their difference value; and feeding that difference value to said feedback circuit (15) which checks whether said difference value is larger than, smaller than or equal to 0 and derives in dependence of the result of that check a control signal which is fed to a control input of the comparative value memory (14), said control signal causing the comparative value memory (14) to send different sets of average reference values to said computing unit (10) until the condition of the difference value equal to 0 is met, which indicates that the difference has reached a value which is closest to zero.

4. A method as set forth in claim 3 wherein said method further comprises the step of providing signal processing means being adapted to derive average values from said output signals by the following sub-steps:

sampling each of said output signals, several times at points of time using a high scanning clock frequency such that the position of the body to be monitored does not markedly change during said sampling procedure to obtain groups of individual amplitude values forming a first average value from a predetermined number of previously ascertained individual amplitude values;

providing said first average value with a first weighting factor and providing the latest individual value with a second weighting factor; and forming a new average value from those two weighted values.

5. A method of ascertaining the position of a body to be monitored, the range of movement of which is subdivided into a plurality of measuring segments which on the one hand are absolutely counted and for which on the other hand fine position values are ascertained as set forth in claim 1, wherein in the calibration run as well as in the measuring mode the output signals of the sensor unit (7) are respectively at least semi-periodic, wherein the semi-period length respectively corresponds to the length of the associated measuring segment.

6. A method as set forth in claim 1 wherein the sensor signals are respectively delivered by magnetic field sensors in the calibration run as well as in the measuring mode.

7. A method as set forth in claim 1 wherein the method further comprises the step of providing a sensor unit (7) including a multiplexer (2), a single processing channel including an amplifier (3) and an analog/digital converter and a demultiplexer, wherein the method further comprises the step of feeding the respective signals of the plurality of sensor elements by means of said multiplexer alternately to said single processing channel, during the calibration run as well as in the measuring mode; and using said demultiplexer for restoration of a multi-channel configuration.

8. A method of ascertaining a fine position value describing the instantaneous absolute position of a movable body said method comprising the step of providing a position sensor which comprises an exciter unit which moves with said movable body and which can pass through a predetermined range of movement, said range comprising at least one measuring segment;

a stationary sensor unit (7) having four sensor elements and being adapted to generate sixteen output signals which form four groups, each of which includes four output signals originating from the same sensor element, which jointly describe the variation in time of said fine position value;

signal processing means adapted to receive said sixteen output signals and, at predeterminable points of time, to derive from said sixteen output signals four average values each originating from one sensor element, said four average values jointly describing said fine position value of said body at a respective point of time, wherein said position sensor further comprises:

a comparative value memory (14) adapted to store reference values;

a computing unit (10) adapted to compare said average values with said reference values;

a calibration unit (31) adapted to receive said average values; and a regulating loop consisting of said computing unit (10), said comparative value memory (14) and a feedback circuit (15), and wherein said method further comprises the following steps:

performing at least one calibration run for calibrating said position sensor, said calibration run comprising the sub-steps of additionally providing a calibration standard (30) comprising a movable scale which also moves with said movable body and, being in a defined relationship with the exciter unit of the position sensor, passes through a corresponding predetermined range of movement; and a stationary detector adapted to sense said movable scale and to generate a calibration fine position value signal representing the variation in time of the instantaneous position of said movable body with high accuracy;

sampling said calibration fine position value signal at predeterminable points of time to obtain calibration fine position values representing said fine position value of said body at the respective point of time and, at each of said points of time, simultaneously sampling said sixteen output signals delivered by said stationary sensor unit (7) in order to obtain four associated average reference values;

feeding each of said calibration fine position values and the associated four average reference values to said calibration unit (31) which puts them together to form multiplets of associated values having a defined relationship and stores said multiplets in said comparative value memory (14) in a retrievable manner;

operating after said calibration run said position sensor without said calibration standard (30) in a measuring mode for ascertaining the current fine position value by the following sub-steps:

feeding the sixteen output signals of sensor unit (7) to said signal processing means, which derive from said output signals four average measurement values;

feeding four said average measurement values to said computing unit (10);

causing said comparative value memory (14) under the control of said feedback unit (15) to feed a set of four average reference values to said computing unit (10) which compares said average reference values with said four average measurement values by forming cross-product differences for each set of average reference values and determines the magnitude of the term repeating that last sub-step under the control of said feedback unit (15) until this term has reached a value closest to zero; and identifying the associated fine position value as being the fine position value of the instantaneous absolute position of said movable body.

9. A method of ascertaining a fine position value describing the instantaneous absolute position of a movable body said method comprising the step of providing a position sensor which comprises:

an exciter unit which moves with said movable body and which can pass through a predetermined range of movement, said range comprising at least one measuring segment;

a stationary sensor unit (7) having four sensor elements and being adapted to generate sixteen output signals which form four groups, each of which includes four output signals originating from the same sensor element which jointly describe the variation in time of said fine position value;

signal processing means adapted to receive said sixteen output signals and, at predeterminable points of time, to derive from said output signals two average values jointly describing said fine position value of said body at a respective point of time, wherein said position sensor further comprises a comparative value memory (14) adapted to store reference values;

a computing unit (10) adapted to compare said two average values $U(z)$, $V(z)$ with said reference values;

a calibration unit (31) adapted to receive said two average values $U(z)$, $V(z)$; and a regulating loop consisting of said computing unit (10) said comparative value memory (14) and a feedback circuit (15), and wherein said method further comprises the following steps:

performing at least one calibration run for calibrating said position sensor, said calibration run comprising the sub-steps of additionally providing a calibration standard (30) comprising a movable scale which also moves with said movable body and, being in a defined relationship with the exciter unit of the position sensor, passes through a corresponding predetermined range of movement; and a stationary detector adapted to sense said movable scale and to generate a calibration fine position value signal representing the variation in time of the instantaneous position of said movable body with high accuracy;

sampling said calibration fine position value signal at predeterminable points of time to obtain calibration fine position values representing said fine position value of said body at the respective point of time and, at each of said points of time, simultaneously sampling said sixteen output signals delivered by said stationary sensor unit (7) in order to obtain two associated average reference values;

feeding each of said calibration fine position values and the associated reference values to said calibration unit (31) which puts them together to form triplets of associated values having a defined relationship and stores said triplets in said comparative value memory (14) in a retrievable manner;

operating after said calibration run said position sensor without said calibration standard (30) in a measuring mode for ascertaining the current fine position value by the following sub-steps:

feeding the sixteen output signals of sensor unit (7) to said signal processing means which derive from said sixteen output signals two average measurement values;

feeding said two average values to said computing unit (10);

causing said comparative value memory (14) under the control of said feedback unit (15) to feed a set of two average reference values to said computing unit (10) which compares said two average reference values with said two average measurement values by forming cross-products for each set of average reference values and determines the magnitude of the term repeating that last sub-step under the control of said feedback unit (15) until this term has reached a value closest to zero; and identifying the associated fine position value as being the fine position value of the instantaneous absolute position of said movable body.

* * * * *